US012172452B2

(12) United States Patent
Koyano et al.

(10) Patent No.: US 12,172,452 B2
(45) Date of Patent: Dec. 24, 2024

(54) LIQUID JET HEAD AND LIQUID JET RECORDING DEVICE

(71) Applicant: SII Printek Inc., Chiba (JP)

(72) Inventors: Takanori Koyano, Chiba (JP); Yuichiro Hamano, Chiba (JP); Masatoshi Seki, Chiba (JP)

(73) Assignee: SII Printek Inc., Chiba (JP)

( * ) Notice: Subject to any disclaimer, the term of this patent is extended or adjusted under 35 U.S.C. 154(b) by 234 days.

(21) Appl. No.: 18/076,804

(22) Filed: Dec. 7, 2022

(65) Prior Publication Data

US 2023/0191814 A1 Jun. 22, 2023

(30) Foreign Application Priority Data

Dec. 17, 2021 (JP) ................................ 2021-205201

(51) Int. Cl.
*B41J 29/377* (2006.01)
*B41J 2/18* (2006.01)

(52) U.S. Cl.
CPC .............. *B41J 29/377* (2013.01); *B41J 2/18* (2013.01); *B41J 2202/08* (2013.01); *B41J 2202/12* (2013.01)

(58) Field of Classification Search
CPC ........ B41J 29/377; B41J 2/18; B41J 2202/08; B41J 2202/12
See application file for complete search history.

(56) References Cited

U.S. PATENT DOCUMENTS 6,254,214 B1 7/2001 Murthy et al.
2015/0258781 A1 9/2015 Domae

FOREIGN PATENT DOCUMENTS

JP 2009285840 A * 12/2009
JP 2015-171806 A 10/2015

OTHER PUBLICATIONS

Extended European Search Report in Europe Application No. 22212914.0, dated Apr. 26, 2023, 10 pages.

* cited by examiner

*Primary Examiner* — Justin Seo
(74) *Attorney, Agent, or Firm* — Crowell & Moring LLP

(57) ABSTRACT

There are provided a liquid jet head and a liquid jet recording device each capable of obtaining a stable ejection performance. An inkjet head includes a head chip provided with a plurality of ejection channels sequentially arranged from a +X direction toward a −X direction in an X direction, and configured to jet ink located inside the ejection channels, a flow channel member which is provided with a guide flow channel for guiding the ink from the +X direction toward the −X direction in the X direction, and in which the guide flow channel is coupled to each of the ejection channels, and a board unit on which a plurality of drive ICs arranged along the X direction is mounted, and which is thermally coupled to the flow channel member, wherein the flow channel member is provided with a cooling flow channel which guides the ink from the −X direction toward the +X direction in the X direction so as to cool the plurality of drive ICs.

11 Claims, 12 Drawing Sheets

LIQUID JET HEAD AND LIQUID JET RECORDING DEVICE

RELATED APPLICATIONS

This application claims priority to Japanese Patent Application No. 2021-205201, filed on Dec. 17, 2021, the entire content of which is incorporated herein by reference.

BACKGROUND OF THE INVENTION

1. Field of the Invention

The present disclosure relates to a liquid jet head and a liquid jet recording device.

2. Description of the Related Art

In JP-A-2015-171806 (Patent Literature 1), there is disclosed a liquid jet head which efficiently cools a drive IC of a circuit section, and with which a device configuration can be simplified. The liquid jet head disclosed in Patent Literature 1 includes a head unit, a circuit unit, and a cooling unit. The head unit includes a supply flow channel for circulating a liquid supplied from the outside, a pressure chamber communicated with the supply flow channel, a drive element for driving the pressure chamber, and a nozzle communicated with the pressure chamber, and ejects a droplet from the nozzle. The circuit unit supplies the drive element with a drive waveform. The cooling unit includes a cooling flow path for circulating the liquid, and is fixed so as to be coupled to the circuit unit. Further, in Patent Literature 1, the liquid is circulated through the supply flow channel and the cooling flow channel in parallel to each other.

In the liquid jet head disclosed in Patent Literature 1, the drive IC is cooled by the liquid flowing through the cooling flow channel disposed in parallel to the supply flow channel. Therefore, the liquid flowing through the cooling flow channel rises in temperature as proceeding downstream. Further, the liquid flowing through the supply flow channel rises in temperature as proceeding downstream due to the influence of heat of the drive element for driving the pressure chamber communicated with the supply flow channel. In Patent Literature 1, a flow direction of the liquid in the cooling flow channel and a flow direction of the liquid in the supply flow channel are the same as each other.

Further, an upstream end of the cooling flow channel and an upstream end of the supply flow channel are coupled to each other, and a downstream end of the cooling flow channel and a downstream end of the supply flow channel are coupled to each other. In other words, the liquid having risen in temperature in the cooling flow channel and the liquid having risen in temperature in the supply flow channel merge with each other at one side in an extending direction of the cooling flow channel and the supply flow channel. Therefore, in the liquid jet head disclosed in Patent Literature 1, the heat collects at the one side in the extending direction of the cooling flow channel and the supply flow channel, and thus, a difference in temperature between the one side and the other side in the extending direction described above becomes large in the whole of the liquid jet head.

In the liquid jet head disclosed in such Patent Literature 1, unevenness of heat distribution in the whole of the liquid jet head is significant. Therefore, when disposing a plurality of pressure chambers in a linear arrangement along the extending direction of the cooling flow channel and the supply flow channel, the difference in temperature due to the positions of the pressure chambers becomes large. As a result, the viscosity of the liquid differs by the position of the pressure chamber, and there is a possibility that there is incurred an ejection failure such as an occurrence of a difference in ejection amount of the liquid due to the position of the pressure chamber.

The present disclosure is made taking the problems described above into consideration, and has an object of providing a liquid jet head and a liquid jet recording device capable of obtaining a stable ejection performance.

SUMMARY OF THE INVENTION

In view of the problems described above, the present disclosure adopts the following aspects.

(1) A liquid jet head according to an aspect of the present disclosure includes a jet unit which is provided with a plurality of pressure chambers arranged in sequence from one side toward the other side in a first direction, and which is configured to jet a liquid located inside the pressure chambers, a flow channel member which is provided with a guide flow channel configured to guide the liquid from the one side toward the other side in the first direction, and in which the guide flow channel is coupled to each of the pressure chambers, and a circuit board on which a plurality of drive controllers arranged along the first direction is mounted, and which is thermally coupled to the flow channel member, wherein the flow channel member is provided with a cooling flow channel which is configured to guide the liquid from the other side toward the one side in the first direction so as to cool the plurality of drive controllers.

The jet unit provided with the pressure chambers for performing the jet operation of the liquid and the plurality of drive controllers are two main heat sources in the liquid jet head. According to the present aspect, the flow channel member is provided with the guide flow channel coupled to the pressure chambers of the jet unit as one of these heat sources. Further, the flow channel member is provided with the cooling flow channel for cooling the plurality of drive controllers as one of these heat sources.

In the guide flow channel and the cooling flow channel described above, the flow direction of the liquid in the guide flow channel and the flow direction of the liquid in the cooling flow channel for cooling the drive controllers are directions opposite to each other. Therefore, in the guide flow channel, the other side in the first direction becomes relatively high in temperature to the one side. In contrast, in the cooling flow channel, the one side in the first direction becomes relatively high in temperature to the other side.

As a result, the temperature distribution in view of the whole of the liquid jet head is homogenized compared to when the flow direction of the liquid in the guide flow channel and the flow direction of the liquid in the cooling flow channel are the same as each other. By the overall heat distribution of the liquid jet head being homogenized, the temperature of the liquid to be supplied to each of the pressure chambers is homogenized, and thus, the viscosity of the liquid in each of the pressure chambers is also homogenized. Therefore, it is possible to obtain the stable ejection performance. Further, by the overall heat distribution of the liquid jet head being homogenized, it is possible to decrease the highest achieving temperature of the drive controllers, and thus, it is possible to stably drive the drive controllers.

(2) In the liquid jet head according to the aspect (1) described above, the flow channel member is provided with an inflow channel configured to guide the liquid inflowing from an outside, and a discharge flow channel configured to guide the liquid to be discharged to the outside, and the guide flow channel and the cooling flow channel are arranged in parallel to each other between the inflow channel and the discharge flow channel.

According to the present aspect, the distance from the inflow channel to the pressure chambers is shorter than when the cooling flow channel is arranged between the inflow channel and the guide flow channel. Therefore, it is possible to reduce the pressure loss in the channels to the pressure chambers, and it becomes possible to suppress a shortage in supply amount of the liquid to the pressure chambers to thereby stably jet the liquid from the pressure chambers.

(3) In the liquid jet head according to the aspect (2) described above, the flow channel member is provided with a first coupling flow channel arranged between the inflow channel and an upstream end of the cooling flow channel, and a second coupling flow channel arranged between a downstream end of the cooling flow channel and the discharge flow channel, and the first coupling flow channel and the second coupling flow channel guide the liquid from the one side toward the other side in the first direction.

According to the present aspect, there is formed a meandering flow channel consisting of the first coupling flow channel, the cooling flow channel, and the second coupling flow channel. Therefore, it becomes possible to further homogenize the overall heat distribution of the liquid jet head.

(4) In the liquid jet head according to the aspect (1) described above, the flow channel member is provided with an inflow channel configured to guide the liquid inflowing from an outside, and a discharge flow channel configured to guide the liquid to be discharged to the outside, and the inflow channel, the guide flow channel, the cooling flow channel, and the discharge flow channel are arranged in series.

According to the present aspect, the liquid to be supplied to the pressure chambers flows through the cooling flow channel. Therefore, it is possible to prevent the pressure from dispersing in the whole flow channels through which the liquid flows compared to when the guide flow channel and the cooling flow channel are arranged in parallel to each other between the inflow channel and the discharge flow channel. Therefore, when assuming that the pressure in an entrance of the inflow channel and the pressure in an exit of the discharge flow channel are in the same condition as the condition when the guide flow channel and the cooling flow channel are arranged in parallel to each other between the inflow channel and the discharge flow channel, the flow rate of the liquid increases. Therefore, it becomes possible to increase the cooling efficiency in the cooling flow channel.

(5) In the liquid jet head according to the aspect (4) described above, the inflow channel, the cooling flow channel, the guide flow channel, and the discharge flow channel are arranged in this order.

In general, the drive controllers become higher in temperature than the jet unit. According to the present aspect, the liquid flows through the cooling flow channel in advance of the guide flow channel. Therefore, the liquid in a lower temperature state than when the liquid which has flowed through the guide flow channel, and has risen in temperature is made to flow through the cooling flow channel can be used for cooling the drive controllers. Therefore, it is possible to increase the cooling efficiency of the drive controllers.

(6) In the liquid jet head according to the aspect (4) described above, the inflow channel, the guide flow channel, the cooling flow channel, and the discharge flow channel are arranged in this order.

According to the present aspect, the distance from the inflow channel to the pressure chambers is shorter than when the cooling flow channel is arranged between the inflow channel and the guide flow channel. Therefore, it is possible to reduce the pressure loss in the channels to the pressure chambers, and it becomes possible to suppress a shortage in supply amount of the liquid to the pressure chambers to thereby stably jet the liquid from the pressure chambers.

(7) In the liquid jet head according to one of the aspects (5) and (6) described above, the flow channel member is provided with a third coupling flow channel configured to couple the guide flow channel and the cooling flow channel to each other, and a fourth coupling flow channel coupled to an end portion of the cooling flow channel, the end portion being located at an opposite side to an end portion of the cooling flow channel in which the cooling flow channel is coupled to the third coupling flow channel, and at least a part of at least one of the third coupling flow channel and the fourth coupling flow channel guides the liquid from the one side toward the other side in the first direction.

According to the present aspect, there is formed a meandering flow channel consisting of the third coupling flow channel, the cooling flow channel, and the fourth coupling flow channel. Therefore, it becomes possible to further homogenize the overall heat distribution of the liquid jet head.

(8) In the liquid jet head according to any one of the aspects (2) through (7) described above, there are further included an inflow port coupled to an upstream end of the inflow channel, and a discharge port coupled to a downstream end of the discharge flow channel, wherein the inflow port and the discharge port are arranged adjacent to each other at the one side or the other side of a center of the flow channel member in the first direction.

According to the present aspect, it becomes possible to arrange a liquid supply tube to be coupled to the inflow port and a liquid discharge tube to be coupled to the discharge port in a lump so as to be adjacent to each other. Therefore, it is more difficult for the inflow port and the discharge port to cause an obstruction of other constituents than when the inflow port and the discharge port are arranged at a distance from each other.

Further, the liquid flows from one side toward the other side in the guide flow channel, and the liquid flows from the other side toward the one side in the cooling flow channel. Therefore, when the guide flow channel and the cooling flow channel are arranged in series to each other, it becomes possible to minimize the length of the flow channel through which the liquid flows.

(9) In the liquid jet head according to the aspect (8) described above, the inflow channel has a separating part which gets away from the discharge flow channel as proceeding downstream.

According to the present aspect, it is possible to prevent the liquid flowing through the inflow channel from rising in temperature due to the liquid high in temperature flowing through the discharge flow channel. Therefore, it is possible to supply the cooling flow channel with the liquid lower in temperature than when not disposing the separating part to thereby increase the cooling efficiency of the drive controllers.

(10) In the liquid jet head according to any one of the aspects (2) through (9) described above, the flow channel member is provided with a second cooling flow channel which is configured to make the liquid flow from the one side toward the other side in the first direction, and the second cooling flow channel is configured to cool one ore more drive controllers located at the other side out of the plurality of drive controllers.

According to the present aspect, it is possible to locally cool the drive controllers arranged at a position where the temperature is apt to rise due to the liquid high in temperature flowing through the discharge flow channel. Therefore, it becomes possible to further decrease the highest achieving temperature of the drive controllers.

(11) A liquid jet recording device according to an aspect of the present disclosure includes the liquid jet head according to any one of the aspects (1) through (10) described above.

According to the present aspect, since there is provided the liquid jet head according to any one of the aspects described above, it is possible to provide the liquid jet recording device having the stable ejection performance.

According to the present disclosure, it is possible to obtain the stable ejection performance.

DETAILED DESCRIPTION OF THE PREFERRED EMBODIMENTS

Figure 1:
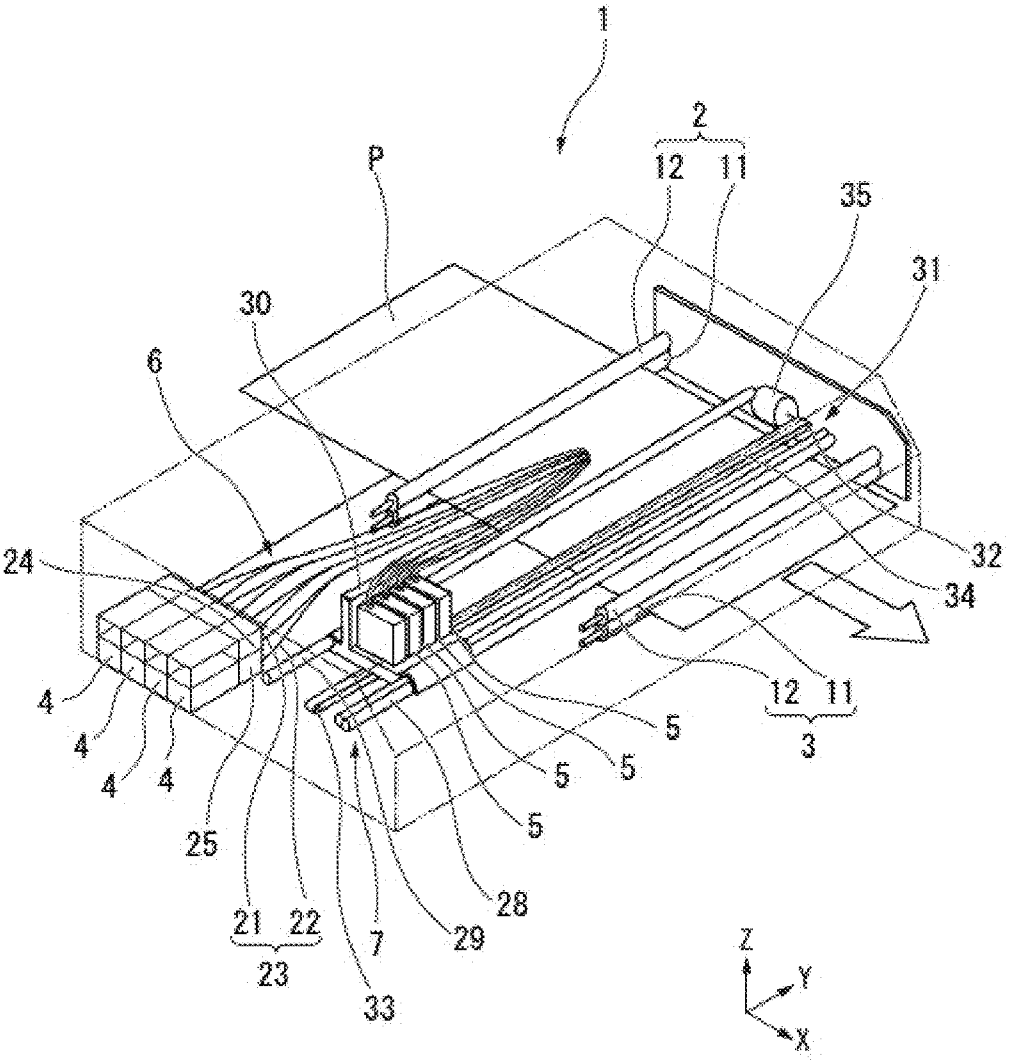
FIG. 1 is a schematic configuration diagram of a printer according to a first embodiment.

Some embodiments according to the present disclosure will hereinafter be described with reference to the drawings. In the embodiments and modified examples described hereinafter, constituents corresponding to each other are denoted by the same reference symbols, and the description thereof will be omitted in some cases. It should be noted that in the following description, expressions representing relative or absolute arrangements such as "parallel," "perpendicular," "center," and "coaxial" not only represent strictly such arrangements, but also represent the state of being relatively displaced with a tolerance, or an angle or a distance to the extent that the same function can be obtained. In the following embodiments, the description will be presented citing an inkjet printer (hereinafter simply referred to as a printer) for performing recording on a recording target medium using ink (liquid) as an example. It should be noted that the scale size of each member is arbitrarily modified so as to provide a recognizable size to the member in the drawings used in the following description.

First Embodiment

[Printer 1]

FIG. 1 is a schematic configuration diagram of a printer 1.

The printer (a liquid jet recording device) 1 shown in FIG. 1 is provided with a pair of conveying mechanisms 2, 3, ink tanks 4, inkjet heads (liquid jet heads) 5, ink circulation mechanisms 6, and a scanning mechanism 7.

In the following explanation, the description is presented using an orthogonal coordinate system of X, Y, and Z as needed. In this case, an X direction coincides with a conveying direction (a sub-scanning direction) of a recording target medium P (e.g., paper). A Y direction coincides with a scanning direction (a main scanning direction) of the scanning mechanism 7. A Z direction represents a height direction (a gravitational direction) perpendicular to the X direction and the Y direction. In the following explanation, the description will be presented defining an arrow side as a positive (+) side, and an opposite side to the arrow as a negative (−) side in the drawings in each of the X direction, the Y direction, and the Z direction. In the present specification, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction.

The ink tanks 4 respectively contain four colors of ink such as yellow ink, magenta ink, cyan ink, and black ink. The inkjet heads 5 are configured so as to be able to respectively eject the four colors of ink, namely the yellow ink, the magenta ink, the cyan ink, and the black ink in accordance with the ink tanks 4 coupled thereto.

Figure 2:
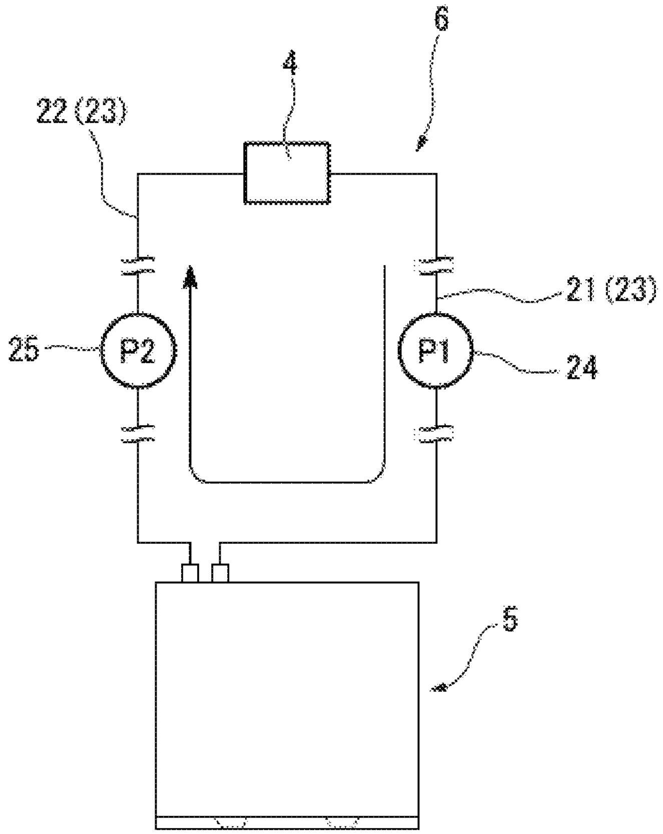
FIG. 2 is a schematic configuration diagram of an inkjet head and an ink circulation mechanism according to the first embodiment.

FIG. 2 is a schematic configuration diagram of the inkjet head 5 and the ink circulation mechanism 6.

As shown in FIG. 2, the ink circulation mechanism 6 circulates the ink between the ink tank 4 and the inkjet head 5. Specifically, the ink circulation mechanism 6 is provided with a circulation flow channel 23 having an ink supply tube 21 and an ink discharge tube 22, a pressure pump 24 coupled to the ink supply tube 21, and a suction pump 25 coupled to the ink discharge tube 22.

The pressure pump 24 pressurizes an inside of the ink supply tube 21 to deliver the ink to the inkjet head 5 through the ink supply tube 21. Thus, the ink supply tube 21 is provided with positive pressure with respect to the inkjet head 5.

The suction pump 25 depressurizes the inside of the ink discharge tube 22 to suction the ink from the inkjet head 5 through the ink discharge tube 22. Thus, the ink discharge tube 22 is provided with negative pressure with respect to the inkjet head 5. It is arranged that the ink can circulate between the inkjet head 5 and the ink tank 4 through the circulation flow channel 23 by driving the pressure pump 24 and the suction pump 25.

As shown in FIG. 1, the scanning mechanism 7 reciprocates the inkjet heads 5 in the Y direction. The scanning mechanism 7 is provided with a pair of guide rails 28, 29, a carriage 30, and a drive mechanism 31, wherein the pair of guide rails 28, 29 extend in the Y direction, the carriage 30 is supported by the pair of guide rails 31, 32 so as to be able to move, and the drive mechanism 31 moves the carriage 30 in the Y direction. It should be noted that the conveying mechanisms 2, 3 and the scanning mechanism 7 move the inkjet heads 5 and the recording target medium P relatively to each other.

The drive mechanism 31 is disposed between the guide rails 28, 29 in the X direction. The drive mechanism 31 is provided with a pair of pulleys 32, 33, an endless belt 34, and a drive motor 35, wherein the pair of pulleys 32, 33 are disposed in the Y direction with a distance, the endless belt 34 is wound between the pair of pulleys 32, 33, and the drive motor 35 rotationally drives the pulley 32 as one of the pulleys 32, 33.

The carriage 30 is coupled to the endless belt 34. On the carriage 30, there is mounted the plurality of inkjet heads 5. In the present embodiment, there are disposed the inkjet head 5 for jetting the yellow ink, the inkjet head 5 for jetting the magenta ink, the inkjet head 5 for jetting the cyan ink, and the inkjet head 5 for jetting the black ink. These inkjet heads 5 are arranged side by side in the Y direction.

[Inkjet Heads 5]

Figure 3:
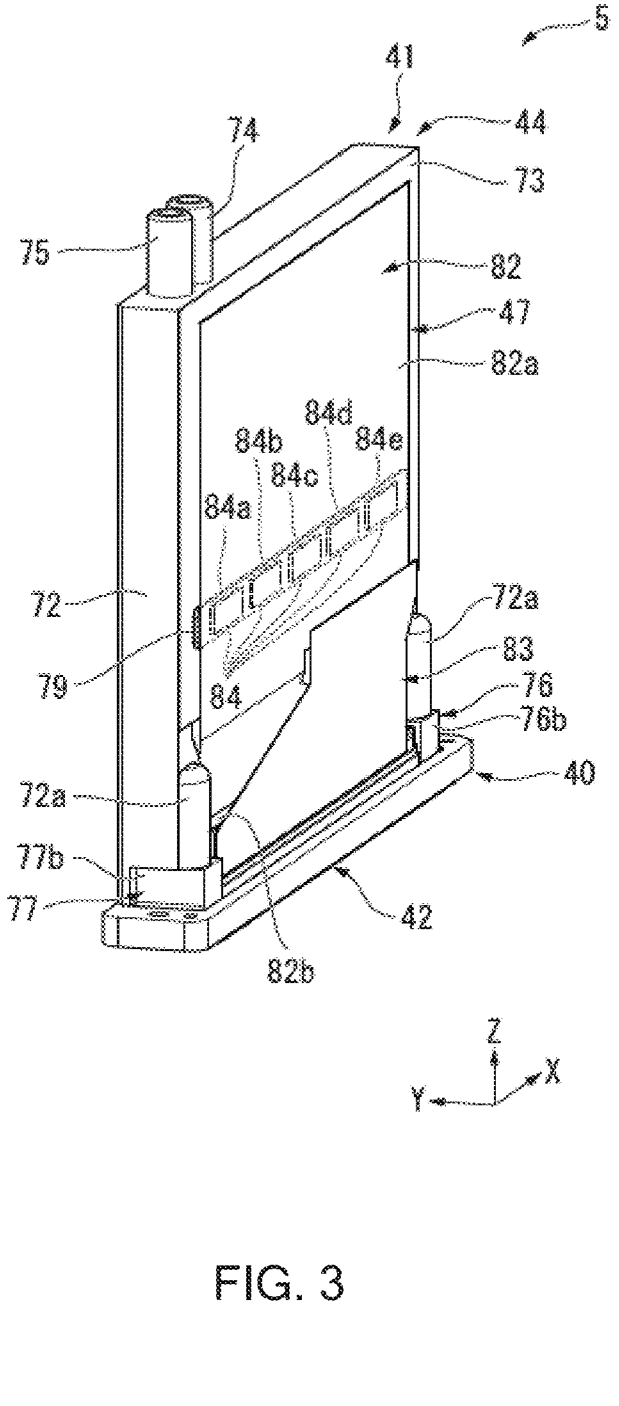
FIG. 3 is a perspective view of the inkjet head according to the first embodiment.
Figure 4:
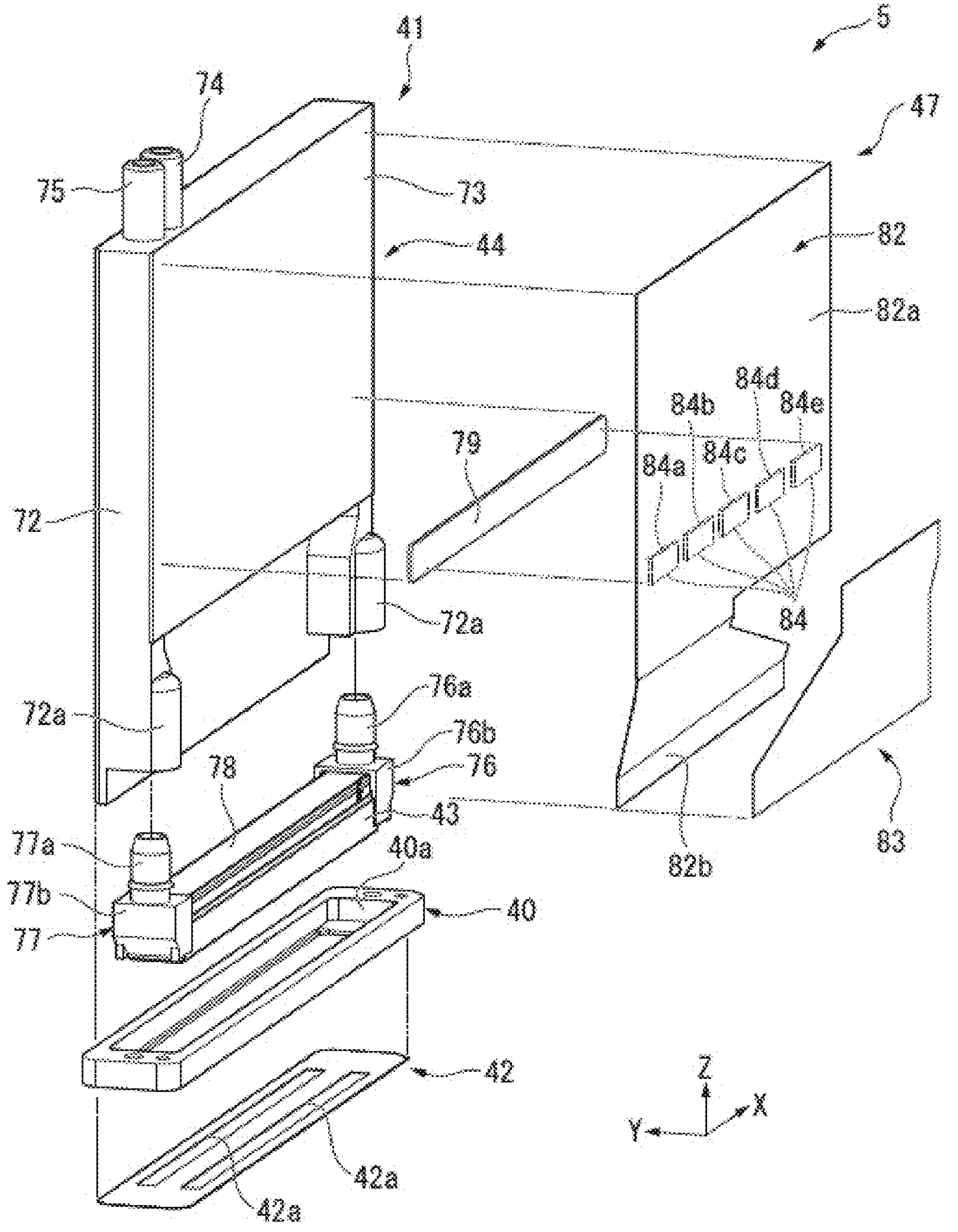
FIG. 4 is a partially exploded perspective view of the inkjet head according to the first embodiment.

FIG. 3 is a perspective view of the inkjet head 5. FIG. 4 is a partially exploded perspective view of the inkjet head 5.

As shown in FIG. 3 and FIG. 4, the inkjet head 5 is provided with a base member 40, a jet module 41, a nozzle guard 42, and so on. The jet module 41 and the nozzle guard 42 are fixed to the base member 40. The base member 40 is fixed to the carriage 30.

[Base Member 40]

The base member 40 is formed to have a plate-like shape having a thickness direction set to the Z direction, and a longitudinal direction set to the X direction. It should be noted that in the present embodiment, the base member 40 is integrally formed of a metal material.

The base member 40 is provided with a module housing part 40*a*. The module housing part 40*a* penetrates the base member 40 in the Z direction. It is arranged that the jet module 41 can be inserted into the module housing part 40*a*. Specifically, by an end portion at a −Z direction side of the jet modules 41 being inserted into the module housing part 40*a*, the jet module 41 is held by the base member 40 in a state of rising from the base member 40 toward the +Z direction. The base member 40 is provided with attachment holes and so on, wherein the base member 40 is attached to the carriage 30 (see FIG. 1) with the attachment holes.

[Jet Module 41]

As shown in FIG. 3 and FIG. 4, the jet module 41 is formed to have a plate-like shape having a thickness direction set to the Y direction. The jet module 41 is configured so as to be able to eject the ink supplied from the ink tank 4 (see FIG. 1) toward the recording target medium P. The jet module 41 is provided with a head chip 43 (a jet unit), a flow channel member 44, a return plate 45 (see FIG. 5), a nozzle plate 46 (see FIG. 5), and a board unit 47 (a circuit board).

[Head Chip 43]

Figure 5:
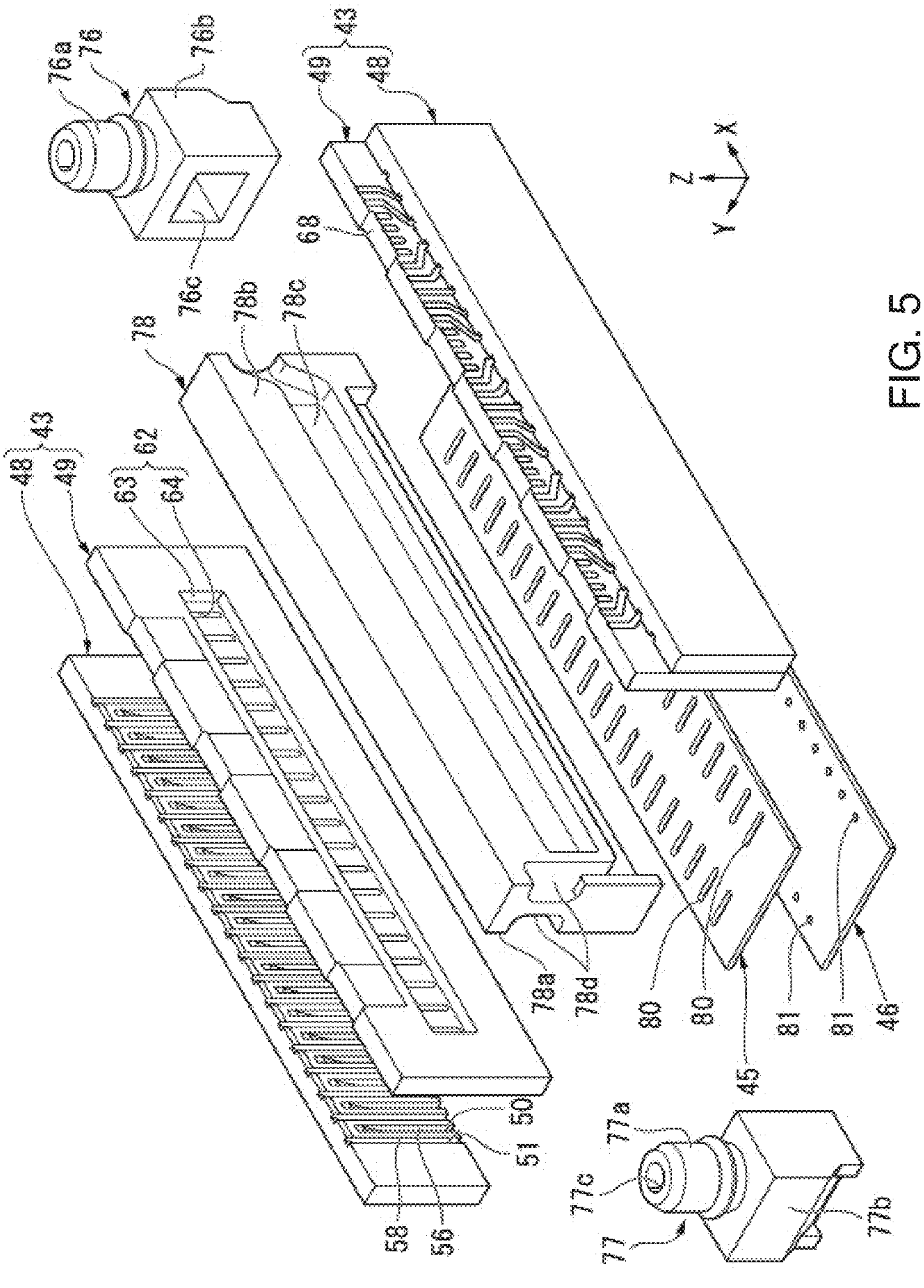
FIG. 5 is an enlarged exploded perspective view of a head chip according to the first embodiment.

FIG. 5 is an enlarged exploded perspective view including the head chip 43. There are disposed two head chip 43 so as to sandwich a second flow channel plate 78 described later of the flow channel member 44 in the Y direction. In other words, in the present embodiment, there are disposed the two head chips 43 forming a pair. It should be noted that these head chips 43 have a symmetric structure across the second flow channel plate 78. Therefore, a structure of one of the head chips 43 will be described, and a detailed description of a structure of the other of the head chips 43 will be omitted.

The head chip 43 is provided with an actuator plate 48 and a cover plate 49. The actuator plate 48 is provided with a plurality of channels 50, 51. The channels 50 as one of the plurality of channels 50, 51 are channels filled with the ink, and are hereinafter referred to as ejection channels 50 (pressure chambers). The channels 51 as the other of the plurality of channels 50, 51 are channels not filled with the ink, and are hereinafter referred to as non-ejection channels 51.

Figure 6:
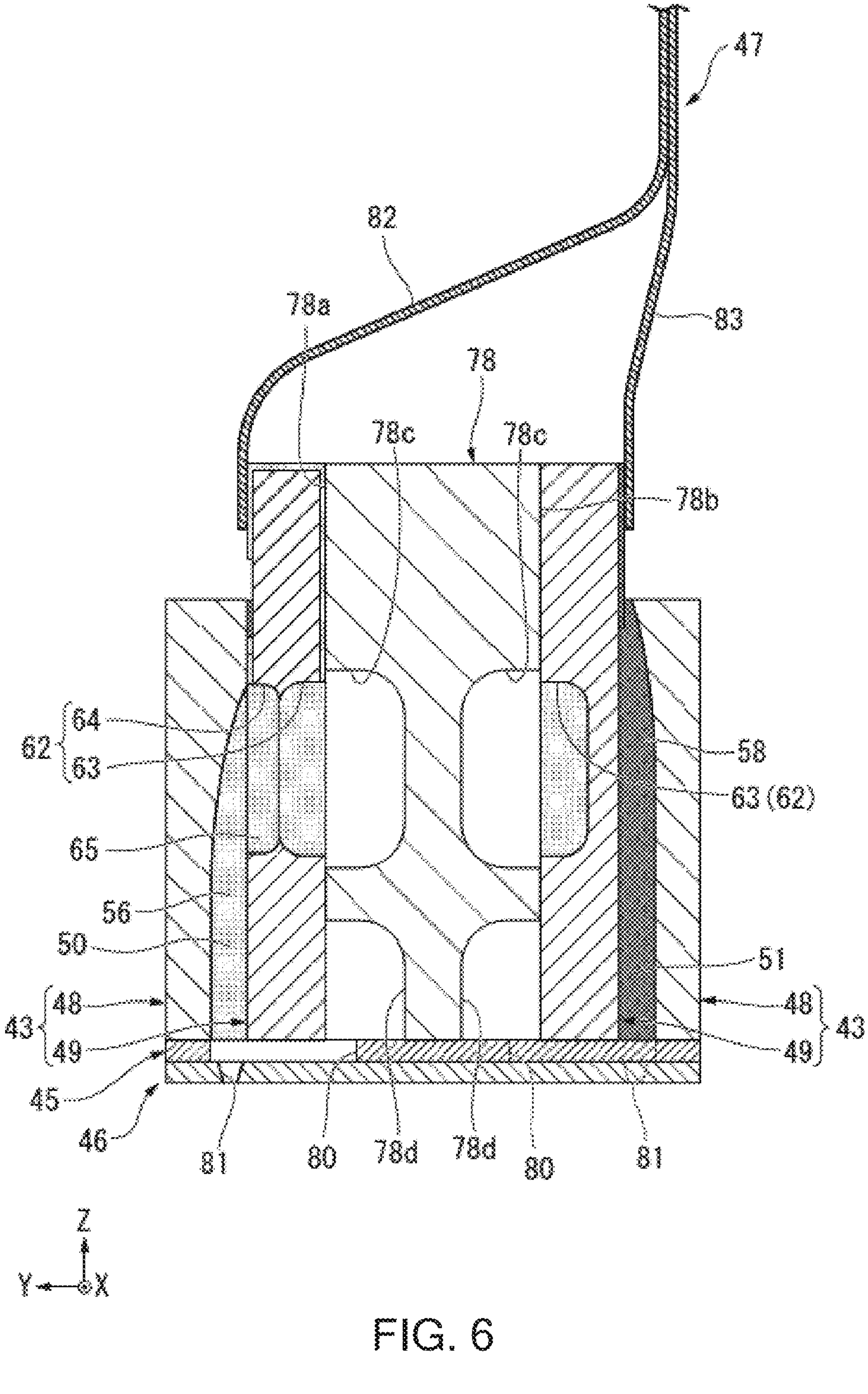
FIG. 6 is a diagram including a cross-sectional surface of an ejection channel in the head chip according to the first embodiment.
Figure 7:
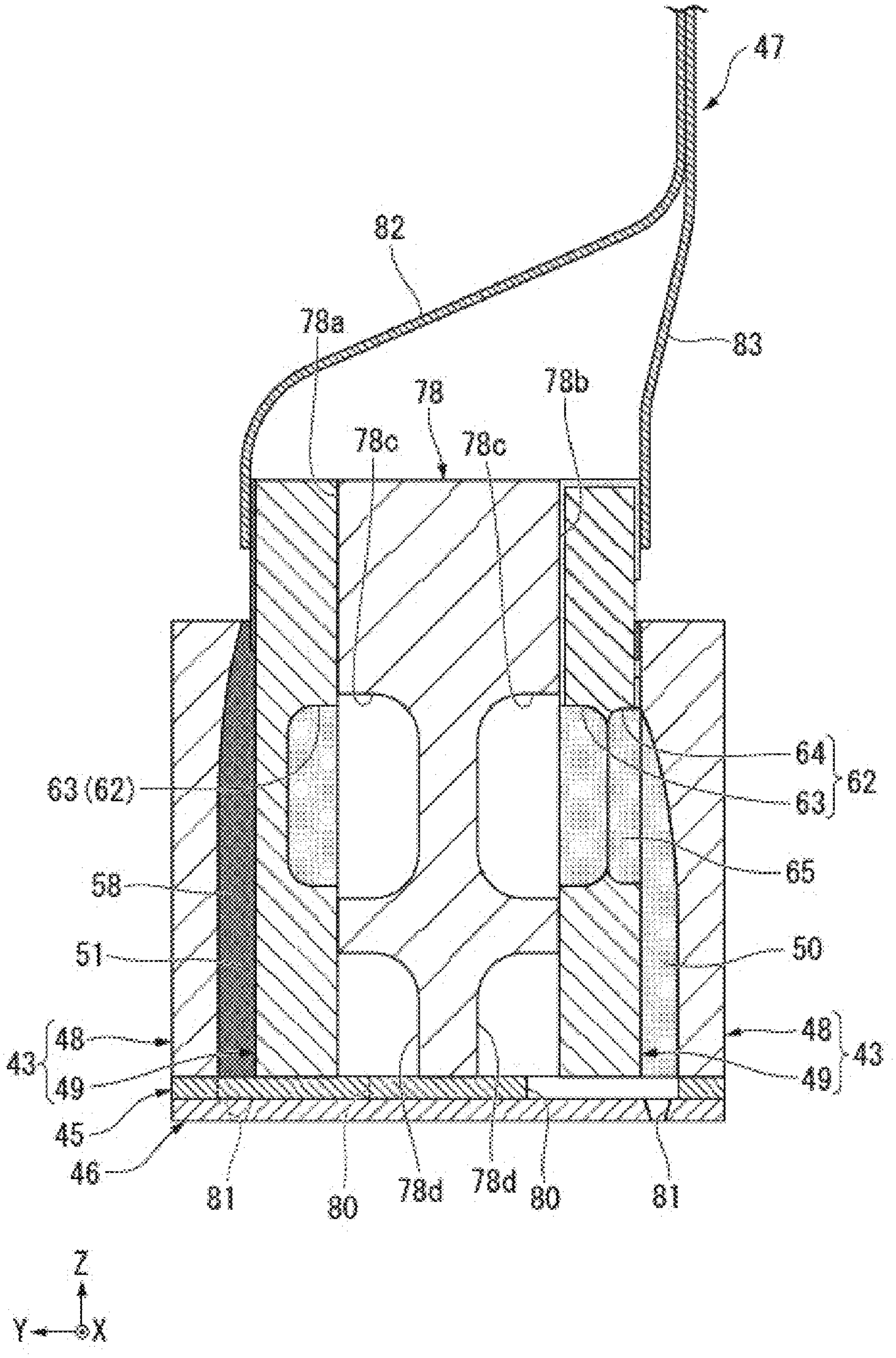
FIG. 7 is a diagram including a cross-sectional surface of a non-ejection channel in the head chip according to the first embodiment.

FIG. 6 is a diagram including a cross-sectional surface of the ejection channel 50 in the one of the head chips 43. FIG. 7 is a diagram including a cross-sectional surface of the non-ejection channel 51 in the one of the head chips 43.

As shown in FIG. 6, on an inner surface of the ejection channel 50, there is formed a common electrode 56. The common electrode 56 is formed on the entire inner surface of the ejection channel 50.

As shown in FIG. 7, on an inner surface of the non-ejection channel 51, there is formed an individual electrode 58.

The individual electrode 58 is individually formed on each of the inner side surfaces opposed to each other in the X direction out of the inner surfaces of the non-ejection channel 51.

The cover plate 49 is provided with a liquid supply channel 62 which penetrates the cover plate 49 in the Y-axis direction, and is communicated with the ejection channels 50. The liquid supply channel 62 includes a common ink chamber 63, and a plurality of slits 64 which is communicated with the common ink chamber 63, and is arranged at intervals in the X direction. The common ink chamber 63 is communicated with the inside of each of the ejection channels 50 through the slit 64. In contrast, the common ink chamber 63 is not communicated with the non-ejection channels 51. The ink inflows into the common ink chamber 63 through the flow channel member 44.

The slits 64 are arranged at positions opposed to the common ink chamber 63 in the Y direction. The slits 64 are communicated with the common ink chamber 63 and the respective ejection channels 50.

The common electrodes 56 formed on the inner surfaces of the plurality of ejection channels 50 are electrically coupled to a drive board 82 described later of the board unit 47. The individual electrodes 58 formed on the inner surfaces of the plurality of non-ejection channels 51 are electrically coupled to a wiring board 83 described later of the board unit 47.

As shown in FIG. 5, the head chips 43 are arranged in the Y direction at a distance from each other. The ejection channels 50 and the non-ejection channels 51 of the one of the head chips 43 are arranged so as to be shifted in the X direction as much as a half pitch with respect to the arrangement pitch of the ejection channels 50 and the non-ejection channels 51 of the other of the head chips 43.

As described above, in the present embodiment, the head chips 43 are each provided with the plurality of ejection channels 50 (the pressure chambers) sequentially arranged from the +X direction (one side) toward the −X direction (the other side) in the X direction (a first direction), and jet the ink located inside the ejection channels 50.

[Flow Channel Member 44]

As shown in FIG. 4, the flow channel member 44 is provided with a first flow channel plate 72, a flow channel cover 73, an inflow port 74, a discharge port 75, an entrance manifold 76, an exit manifold 77, a second flow channel plate 78, and a heat-transfer plate 79.

Figure 8:
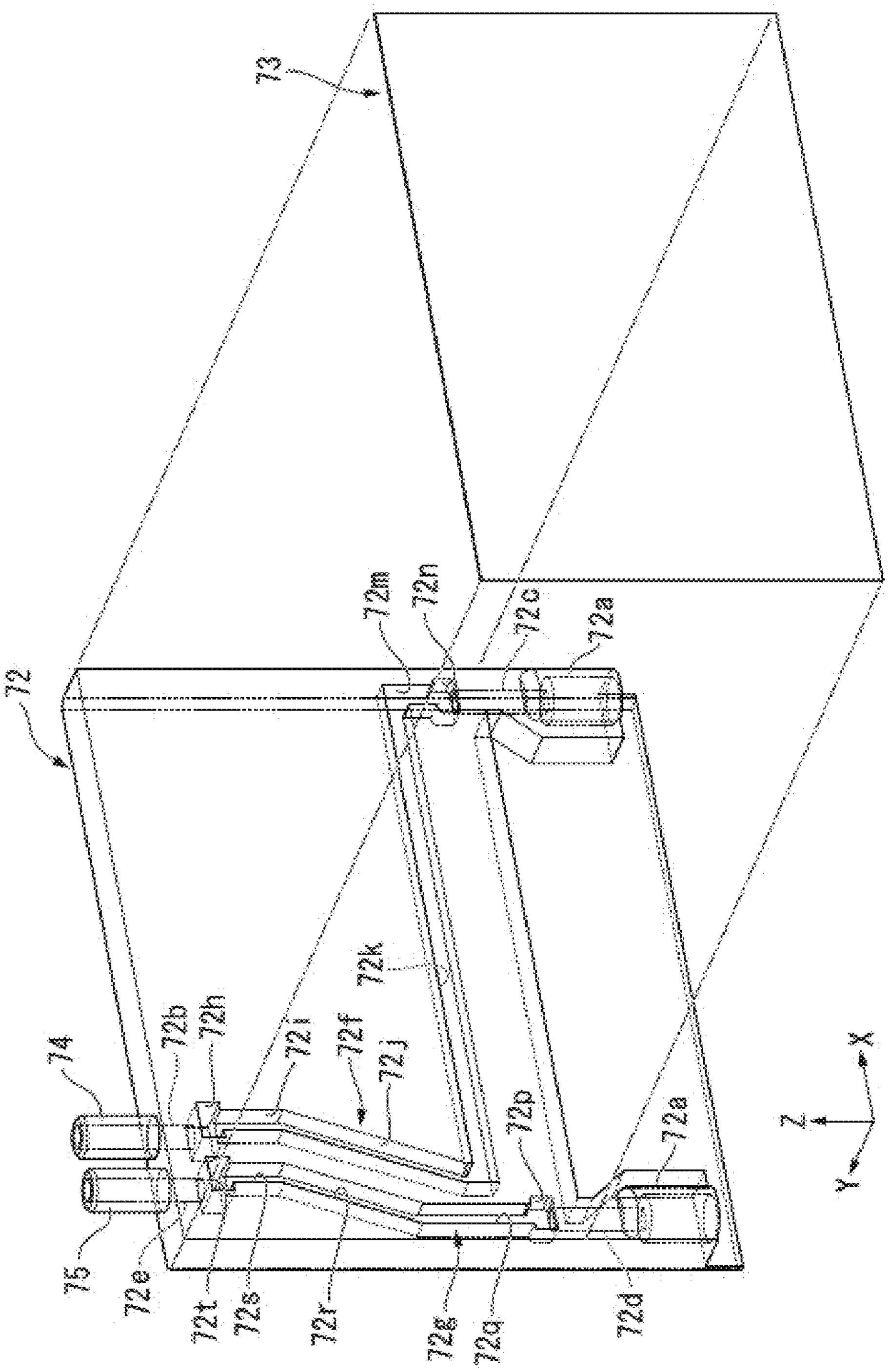
FIG. 8 is an exploded perspective view including a first flow channel plate and a flow channel cover according to the first embodiment.

FIG. 8 is an exploded perspective view including the first flow channel plate 72 and the flow channel cover 73. As shown in FIG. 8, the first flow channel plate 72 is formed to have a rectangular plate shape having an obverse surface and a reverse surface facing the Y direction. The first flow channel plate 72 is integrally formed of the same member. When viewed from the Y direction, an outer shape of the first flow channel plate 72 is formed to have a rectangular shape.

As shown in FIG. 8, an end portion at the −Z direction side of the first flow channel plate 72 is provided with two insertion parts 72*a*. These insertion parts 72*a* are arranged along the X direction at a distance from each other in the X direction. The insertion parts 72*a* are each formed as a hollow body having an internal space opened toward the −Z direction. One of the insertion parts 72*a* is arranged in an end portion at the +X direction side of the first flow channel plate 72, and the entrance manifold 76 is inserted into the one of the insertion parts 72*a* from the −Z direction as shown in FIG. 3 and FIG. 4. The other of the insertion parts 72*a* is arranged in an end portion at the −X direction side of the first flow channel plate 72, and the exit manifold 77 is inserted into the other of the insertion parts 72*a* from the −Z direction as shown in FIG. 3 and FIG. 4.

As shown in FIG. 8, inside the first flow channel plate 72, there are disposed a first internal flow channel 72*b*, a second internal flow channel 72*c*, a third internal flow channel 72*d*, and a fourth internal flow channel 72*e*. The first internal flow channel 72*b* is disposed so as to extend in the Z direction, and is coupled to the inflow port 74 from the −Z direction. The second internal flow channel 72*c* is disposed so as to extend in the Z direction, and is coupled from the +Z direction to the internal space of the insertion part 72*a* to which the entrance manifold 76 is inserted.

The third internal flow channel 72*d* is disposed so as to extend in the Z direction, and is coupled from the +Z direction to the internal space of the insertion part 72*a* to which the exit manifold 77 is inserted. The fourth internal flow channel 72*e* is disposed so as to extend in the Z direction, and is coupled to an internal space of the discharge port 75 from the −Z direction.

As shown in FIG. 8, the first flow channel plate 72 is provided with a first groove part 72*f* and a second groove part 72*g*. The first groove part 72*f* and the second groove part 72*g* are both disposed so as to be exposed on a surface at the +Y direction side of the first flow channel plate 72. In other words, the first groove part 72*f* and the second groove part 72*g* are opened toward the −Y direction.

The first groove part 72*f* couples the first internal flow channel 72*b* and the second internal flow channel 72*c* to each other to guide the ink between the first internal flow channel 72*b* and the second internal flow channel 72*c*. As shown in FIG. 8, the first groove part 72*f* has a first entrance end portion 72*h* coupled to the first internal flow channel 72*b* from the −Z direction. Further, the first groove part 72*f* has a first vertical part 72*i* extending from the first entrance end portion 72*h* toward the −Z direction. Further, the first groove part 72*f* has a first tilted part 72*j* displaced toward the −X direction as proceeding toward the −Z direction from an end portion at the −Z direction side of the first vertical part 72*i*. Further, the first groove part 72*f* has a horizontal part 72*k* extending from an end portion at the −Z direction side of the first tilted part 72*j* toward the +X direction. Further, the first groove part 72*f* has a second vertical part 72*m* extending from an end portion at the +X direction side of the horizontal part 72*k* toward the −Z direction. Further, the first groove part 72*f* has a first exit end portion 72*n* which is coupled to an end portion at the −Z direction side of the second vertical part 72*m* from the −Z direction, and which is coupled to the second internal flow channel 72*c* from the +Z direction.

The second groove part 72*g* couples the third internal flow channel 72*d* and the fourth internal flow channel 72*e* to each other to guide the ink between the third internal flow channel 72*d* and the fourth internal flow channel 72*e*. As shown in FIG. 8, the second groove part 72*g* has a second entrance end portion 72*p* coupled to the third internal flow channel 72*d* from the +Z direction. Further, the second groove part 72*g* has a third vertical part 72*q* extending from the second entrance end portion 72*p* toward the +Z direction. Further, the second groove part 72*g* has a second tilted part 72*r* displaced toward the +X direction as proceeding toward the +Z direction from an end portion at the +Z direction side of the third vertical part 72*q*. Further, the second groove part 72*g* has a fourth vertical part 72*s* extending from an end portion at the +Z direction side of the second tilted part 72*r* toward the +Z direction. Further, the second groove part 72*g* has a second exit end portion 72*t* which is coupled to an end portion at the +Z direction side of the fourth vertical part 72*s* from the +Z direction, and which is coupled to the fourth internal flow channel 72*e* from the −Z direction.

In the present embodiment, as shown in FIG. 8, the first internal flow channel 72*b* and the fourth internal flow channel 72*e* are arranged at the same position in the Z direction. Further, the first internal flow channel 72*b* and the fourth internal flow channel 72*e* are both arranged at the −X direction side of the central position in the X direction of the first flow channel plate 72.

Further, the second internal flow channel 72*c* and the third internal flow channel 72*d* are arranged at the same position in the Z direction. The second internal flow channel 72*c* is arranged at the +X direction side of a central position in the X direction of the first flow channel plate 72. The third internal flow channel 72*d* is arranged at the −X direction side of the central position in the X direction of the first flow channel plate 72.

Further, the first entrance end portion 72*h* and the second exit end portion 72*t* are arranged at the same position in the Z direction. Further, the first entrance end portion 72*h* and the second exit end portion 72*t* are both arranged at the −X direction side of the central position in the X direction of the first flow channel plate 72.

Further, the first vertical part 72*i* and the fourth vertical part 72*s* are arranged at substantially the same positions in the Z direction. Further, the first vertical part 72*i* and the fourth vertical part 72*s* are both arranged at the −X direction side of the central position in the X direction of the first flow channel plate 72.

Further, the first tilted part 72*j* and the second tilted part 72*r* are arranged at substantially the same positions in the Z direction. Further, the first tilted part 72*j* and the second tilted part 72*r* are both arranged at the −X direction side of the central position in the X direction of the first flow channel plate 72.

Further, an end portion at the −X direction side of the horizontal part 72*k* is arranged at the −X direction side of the central position in the X direction of the first flow channel plate 72. An end portion at the +X direction side of the horizontal part 72*k* is arranged at the +X direction side of the central position in the X direction of the first flow channel plate 72.

Further, the second vertical part 72*m* and the first exit end portion 72*n* are arranged at the +X direction side of the central position in the X direction of the first flow channel plate 72. Further, the second entrance end portion 72*p* and the third vertical part 72*q* are arranged at the −X direction side of the central position in the X direction of the first flow channel plate 72.

The flow channel cover 73 is a plate member bonded to a surface at the −Y direction side of the first flow channel plate 72. When viewed from the Y direction, a width in the X direction of the flow channel cover 73 coincides with a width in the X direction of the first flow channel plate 72. Further, an end portion at the +Z direction side of the flow channel cover 73 is arranged at the same position in the Z direction as an end portion at the +Z direction side of the first flow channel plate 72. A height in the Z direction of the flow channel cover 73 is set to a dimension for the flow channel cover 73 to be able to cover a whole of the first groove part 72*f* and the second groove part 72*g*.

The inflow port 74 is disposed so as to protrude toward the +Z direction from a surface (an upper surface) facing the +Z direction of the first flow channel plate 72. The inflow port 74 is coupled to the ink supply tube 21 (see FIG. 1). Further, the inflow port 74 is coupled to the first internal flow channel 72*b* of the first flow channel plate 72 from the +Z direction. The inflow port 74 guides the ink which is supplied from the ink supply tube 21, to the first internal flow channel 72*b*.

The discharge port 75 is disposed so as to protrude toward the +Z direction from the surface (the upper surface) facing the +Z direction of the first flow channel plate 72. The discharge port 75 is coupled to the ink discharge tube 22 (see FIG. 1). Further, the discharge port 75 is coupled to the fourth internal flow channel 72*e* of the first flow channel plate 72 from the +Z direction. The discharge port 75 guides the ink which is discharged from the fourth internal flow channel 72*e*, to the ink discharge tube 22.

In the present embodiment, the first internal flow channel 72*b* and the fourth internal flow channel 72*e* are both arranged at the −X direction side of the central position in the X direction of the first flow channel plate 72. Therefore, the inflow port 74 coupled to the first internal flow channel 72*b* and the discharge port 75 coupled to the fourth internal flow channel 72*e* are both arranged at the −X direction side of the central position in the X direction of the first flow channel plate 72.

As described above, in the present embodiment, there are provided the inflow port 74 which is coupled to an upstream end (the end portion at the +Z direction side) of the first internal flow channel 72*b*, and the discharge port 75 which is coupled to a downstream end (the end portion at the +Z direction side) of the fourth internal flow channel 72*e*. Further, the inflow port 74 and the discharge port 75 are arranged so as to be adjacent to each other at the −X direction side (one side) of the center of the flow channel member 44 in the X direction (the first direction).

It should be noted that by changing the positions of the first internal flow channel 72*b* and the fourth internal flow channel 72*e* and the positions and the shapes of the first groove part 72*f* and the second groove part 72*g*, it is also possible to arrange the inflow port 74 and the discharge port 75 so as to be adjacent to each other at the +X direction side (the other side) of the center of the flow channel member 44 in the X direction (the first direction).

The entrance manifold 76 (see FIG. 5) is bonded to the end portions at the +X direction side of the two head chips 43 and the second flow channel plate 78 in a lump, and at the same time, is inserted into the insertion part 72*a* at the +X direction side of the first flow channel plate 72. The entrance manifold 76 is provided with an entrance protruding part 76*a* to be inserted into the insertion part 72*a* from the −Z direction. Further, the entrance manifold 76 is provided with an entrance base part 76*b* which is coupled to the entrance protruding part 76*a* from the −Z direction, and which is bonded to end portions at the +X direction side of the two head chips 43 and the second flow channel plate 78.

Further, the entrance manifold 76 is provided with an internal flow channel 76*c*. The internal flow channel 76*c* has an end portion at the +Z direction side of the entrance protruding part 76*a*, and an opening end on a surface at the −X direction side of the entrance base part 76*b*.

As shown in FIG. 5, the exit manifold 77 is bonded to an end portions at the −X direction side of the two head chips 43 and the second flow channel plate 78 in a lump, and at the same time, is inserted into the insertion part 72*a* at the −X direction side of the first flow channel plate 72. The exit manifold 77 is provided with an exit protruding part 77*a* to be inserted into the insertion part 72*a* from the −Z direction. Further, the exit manifold 77 is provided with an exit base part 77*b* which is coupled to the exit protruding part 77*a* from the −Z direction, and which is bonded to end portions at the −X direction side of the two head chips 43 and the second flow channel plate 78. Further, the exit manifold 77 is provided with an internal flow channel 77*c*. The internal flow channel 77*c* has an end portion at the +Z direction side of the exit protruding part 77*a*, and an opening end on a surface at the +X direction side of the exit base part 77*b*.

The second flow channel plate 78 is held between the two head chips 43 in the Y direction. The second flow channel plate 78 is integrally formed of the same member. As shown in FIG. 5, an outer shape of the second flow channel plate 78 forms a rectangular plate-like shape having long sides in the X direction and short sides in the Z direction. When viewed from the Y direction, the outer shape of the second flow channel plate 78 is substantially the same as the outer shape of the cover plate 49.

To a first principal surface 78*a* facing the +Y direction of the second flow channel plate 78, there is bonded one of the head chips 43. To a second principal surface 78*b* facing the −Y direction of the second flow channel plate 78, there is bonded the other of the head chips 43.

The second flow channel plate 78 is formed of a material which has an insulating property, and which has thermal conductivity no lower than that of the cover plate 49. For example, when forming the cover plate 49 from silicon, it is preferable for the second flow channel plate 78 to be formed of silicon or carbon. Thus, it is possible to relax a temperature variation in the cover plate 49 between the head chips

43. Therefore, it is possible to relax the temperature variation in the actuator plate 48 to achieve homogenization of the ink temperature between the head chips 43. Thus, it is possible to achieve the homogenization of the ejection speed of the ink to improve printing stability.

The second flow channel plate 78 is provided with entrance flow channels 78*c* respectively communicated with the common ink chambers 63, and exit flow channels 78*d* communicated with each of circulation channels 80 described later of the return plate 45. An end portion at the +X direction side of each of the entrance flow channels 78*c* opens on one end surface at the +X direction side of the second flow channel plate 78. Each of the entrance flow channels 78*c* is tilted so as to be located at a lower position as proceeding toward the −X direction from one end surface in the +X direction of the second flow channel plate 78, and then bend toward the other end at the −X direction side of the second flow channel plate 78, and then linearly extend. The entrance flow channel 78*c* is coupled to the entrance manifold 76 on the other end surface at the +X direction side of the second flow channel plate 78. The entrance flow channels 78*c* are arranged at a distance in the Y direction between the one of the head chips 43 and the other of the head chips 43.

As shown in FIG. 5, one end portion of each of the exit flow channels 78*d* opens on the other end surface at the −X direction side of the second flow channel plate 78. Each of the exit flow channels 78*d* bends downward from the other end surface at the −X direction side of the second flow channel plate 78 so as to form a crank-like shape, and then extends linearly toward the +X direction. The exit flow channel 78*d* is coupled to the exit manifold 77 on the other end surface at the −X direction side of the second flow channel plate 78. The exit flow channels 78*d* are arranged at a distance in the Y direction between the one of the head chips 43 and the other of the head chips 43.

As shown in FIG. 3 and FIG. 4, the heat-transfer plate 79 is bonded to a surface at the −Y direction side of the flow channel cover 73. The heat-transfer plate 79 makes contact with a plurality of drive ICs 84 described later of the board unit 47 from the +Y direction. The heat-transfer plate 79 thermally couples the drive ICs 84 to the flow channel cover 73. As shown in FIG. 4, the heat-transfer plate 79 is formed to have a rectangular plate-like shape having a thickness direction set to the Y direction, and a longitudinal direction set to the X direction. When viewed from the Y direction, the heat-transfer plate 79 is arranged so as to overlap the horizontal part 72*k* of the first groove part 72*f*.

In the present embodiment, the flow channel member 44 is provided with a flow channel of the ink (hereinafter referred to as an ink flow channel 100) (see FIG. 9). The ink flow channel 100 is formed including the first internal flow channel 72*b*, the second internal flow channel 72*c*, the third internal flow channel 72*d*, the fourth internal flow channel 72*e*, the first groove part 72*f*, the second groove part 72*g*, the internal flow channel 76*c*, the internal flow channel 77*c*, the entrance flow channel 78*c*, and the exit flow channel 78*d*. In the present embodiment, the first internal flow channel 72*b*, the first groove part 72*f*, the second internal flow channel 72*c*, the internal flow channel 76*c*, the entrance flow channel 78*c*, the exit flow channel 78*d*, the internal flow channel 77*c*, the third internal flow channel 72*d*, the second groove part 72*g*, and the fourth internal flow channel 72*e* are arranged in this order from the upstream in the flow direction of the ink in the ink flow channel 100.

Figure 9:
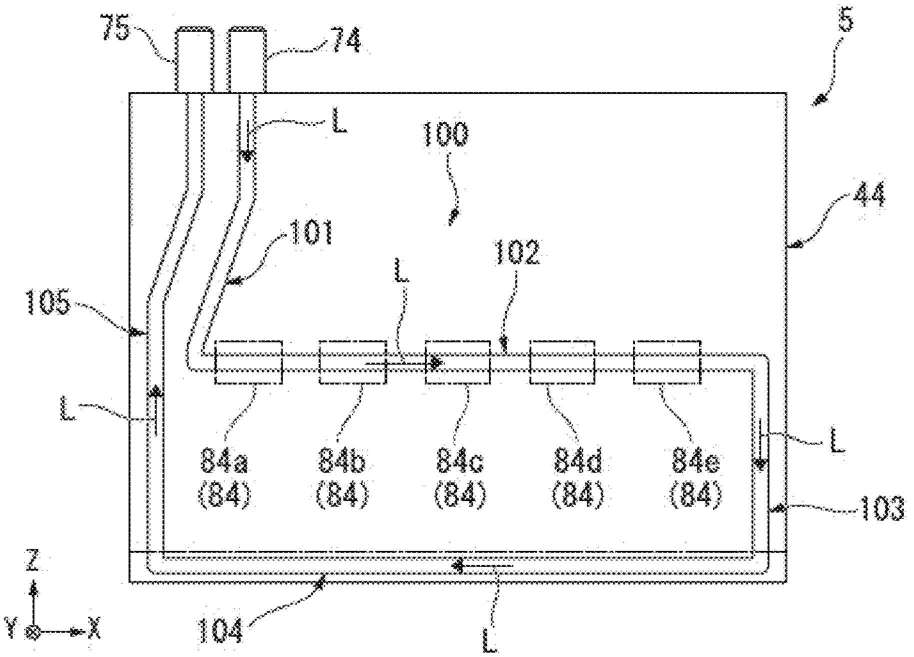
FIG. 9 is a schematic diagram of the inkjet head including an ink flow channel according to the first embodiment.

FIG. 9 is a schematic diagram of the inkjet head 5 including the ink flow channel 100. In the present embodiment, the ink flow channel 100 has an inflow channel 101, a cooling flow channel 102, a coupling flow channel 103, a guide flow channel 104, and a discharge flow channel 105. It should be noted that in FIG. 9 and the subsequent drawings, a reference symbol L is attached to the flow of the ink.

The inflow channel 101 guides the ink inflowing into the flow channel member 44 from the outside (the ink supply tube 21) of the flow channel member 44 via the inflow port 74. The inflow channel 101 couples the inflow port 74 and the cooling flow channel 102 to each other. An upstream end of the inflow channel 101 is coupled to the inflow port 74. A downstream end of the inflow channel 101 is coupled to the cooling flow channel 102. In the present embodiment, the inflow channel 101 is formed including the first internal flow channel 72*b* (see FIG. 8), the first entrance end portion 72*h* (see FIG. 8) of the first groove part 72*f*, the first vertical part 72*i* (see FIG. 8) of the first groove part 72*f*, and the first tilted part 72*j* (see FIG. 8) of the first groove part 72*f*.

The cooling flow channel 102 guides the ink from the −X direction (the other side) toward the +X direction (the one side) in the X direction (the first direction) so as to cool the plurality of drive ICs 84. The cooling flow channel 102 couples the inflow channel 101 and the coupling flow channel 103 to each other. An upstream end of the cooling flow channel 102 is coupled to the inflow channel 101. A downstream end of the cooling flow channel 102 is coupled to the coupling flow channel 103. The cooling flow channel 102 is formed including the horizontal part 72*k* (see FIG. 8) of the first groove part 72*f*. In the present embodiment, the cooling flow channel 102 is arranged so as to overlap the plurality of drive ICs 84 and the heat-transfer plate 79 when viewed from the Y direction.

The coupling flow channel 103 guides the ink between the cooling flow channel 102 and the guide flow channel 104. The coupling flow channel 103 couples the cooling flow channel 102 and the guide flow channel 104 to each other. An upstream end of the coupling flow channel 103 is coupled to the cooling flow channel 102. A downstream end of the coupling flow channel 103 is coupled to the guide flow channel 104. The coupling flow channel 103 is formed including the second vertical part 72*m* (see FIG. 8) of the first groove part 72*f*, the first exit end portion 72*n* (see FIG. 8) of the first groove part 72*f*, the second internal flow channel 72*c*, and the internal flow channel 76*c*.

The guide flow channel 104 guides the ink from the +X direction (one side) toward the −X direction (the other side) in the X direction. The guide flow channel 104 is coupled to the plurality of ejection channels 50 (the pressure chambers) of the head chips 43. The guide flow channel 104 couples the coupling flow channel 103 and the discharge flow channel 105 to each other. An upstream end of the guide flow channel 104 is coupled to the coupling flow channel 103. A downstream end of the guide flow channel 104 is coupled to the discharge flow channel 105. The guide flow channel 104 is formed including the entrance flow channels 78*c* (see FIG. 5) and the exit flow channels 78*d* (see FIG. 5).

It should be noted that as described above, as a part of the entrance flow channel 78*c*, there is included a region which is tilted so as to be located at a lower position as proceeding toward the −X direction from one end surface at the +X direction side of the second flow channel plate 78. In this region, the ink flows obliquely with respect to a horizontal direction so as to proceed downward as proceeding toward the −X direction from the +X direction. Further, as a part of the exit flow channels 78*d*, there is included a region bending downward from the other end surface at the −X direction side of the second flow channel plate 78 so as to form a crank-like shape. In this region, the ink flows so as to proceed upward from below. It should be noted that these regions are disposed in small portions of the entrance flow channel 78*c* and the exit flow channel 78*d*, respectively. Therefore, the ink in the entrance flow channel 78*c* and the exit flow channel 78*d* flows mainly from the +X direction toward the −X direction.

Further, in the guide flow channel 104, an end portion at the +X direction side of each of the entrance flow channels 78*c* is coupled to the coupling flow channel 103, and an end portion at the −X direction side of each of the exit flow channels 78*d* is coupled to the discharge flow channel 105. Further, between the entrance flow channel 78*c* and the exit flow channel 78*d*, there is arranged the head chip 43. In other words, the guide flow channel 104 is a flow channel for guiding the ink mainly from the +X direction toward the −X direction as a whole, but is not a simple linear flow channel in the actual structure. It should be noted that in FIG. 9, the guide flow channel 104 is schematically illustrated as a single flow channel, the end portion at the +X direction side is coupled to the coupling flow channel 103, and the end portion at the −X direction side is coupled to the discharge flow channel 105 for the sake of convenience of explanation. It should be noted that in the drawings subsequent to FIG. 9, the guide flow channel is schematically illustrated as a single flow channel similarly to the above.

In other words, the ink flows in the guide flow channel 104 including these entrance flow channels 78*c* and these exit flow channels 78*d* mainly from the +X direction toward the −X direction. Further, in the guide flow channel 104, a flow of the ink toward a direction different from the main flow direction can partially be included. Further, also in the cooling flow channel 102, a flow of the ink toward a direction different from the main flow direction (from the −X direction toward the +X direction) can partially be included similarly to the above.

The discharge flow channel 105 guides the ink to be discharged to the outside (the ink discharge tube 22) of the flow channel member 44 via the discharge port 75. The discharge flow channel 105 couples the guide flow channel 104 and the discharge port 75 to each other. An upstream end of the discharge flow channel 105 is coupled to the guide flow channel 104. A downstream end of the discharge flow channel 105 is coupled to the discharge port 75. In the present embodiment, the discharge flow channel 105 is formed including the internal flow channel 77*c* (see FIG. 8), the third internal flow channel 72*d* (see FIG. 8), the second groove part 72*g* (see FIG. 8), and the fourth internal flow channel 72*e* (see FIG. 8).

As described above, in the present embodiment, the inflow channel 101, the guide flow channel 104, the cooling flow channel 102, and the discharge flow channel 105 are arranged in series in the ink flow channel 100. Further, in the flow direction of the ink, the inflow channel 101, the cooling flow channel 102, the guide flow channel 104, and the discharge flow channel 105 are arranged in this order.

The ink flowing through the ink flow channel 100 is guided from the inflow port 74 to the inflow channel 101, and is supplied to the cooling flow channel 102. The ink is horizontally guided in the cooling flow channel 102 from the −X direction toward the +X direction. The ink flowing through the cooling flow channel 102 rises in temperature as proceeding toward downstream (i.e., the +X direction) due to heat exchange with the drive ICs 84. The ink discharged from the cooling flow channel 102 is supplied to the guide flow channel 104 via the coupling flow channel 103. The ink is horizontally guided in the guide flow channel 104 from the +X direction toward the −X direction.

The head chips 43 rise in temperature due to heat generation caused by the drive of the actuator plates 48. Therefore, the ink flowing through the guide flow channel 104 rises in temperature as proceeding toward downstream (i.e., the −X direction) due to heat exchange with the head chips 43. The ink discharged from the guide flow channel 104 is supplied to the discharge port 75 via the discharge flow channel 105.

As described above, the ink rises in temperature in the cooling flow channel 102 and the guide flow channel 104. In the present embodiment, the flow directions of the ink in the cooling flow channel 102 and the guide flow channel 104 are opposite to each other. In other words, the ink flows in the cooling flow channel 102 from the −X direction toward the +X direction, and the ink flows in the guide flow channel 104 from the +X direction toward the −X direction.

[Return Plate 45]

The return plate 45 is disposed at an opening end side of the ejection channels 50 in the head chip 43. The return plate 45 is a spacer plate intervening between the opening end of the ejection channels 50 in one of the head chips 43 and the other of the head chips 43, and an upper end of the nozzle plate 46. The return plate 45 is provided with the plurality of circulation channels 80 for coupling the ejection channels 50 of each of the head chips 43 and the exit flow channels 78*d* to each other.

[Nozzle Plate 46]

The nozzle plate 46 is bonded to a lower end surface of the return plate 45. In the nozzle plate 46, there is arranged a plurality of nozzle holes 81 penetrating the nozzle plate 46 in the Z direction. The nozzle holes 81 are communicated with the corresponding ejection channels 50 of the head chips 43 via the circulation channels 80, respectively.

In contrast, the non-ejection channels 51 are not communicated with the nozzle holes 81, but are covered with the return plate 45 from below.

[Board Unit 47]

As shown in FIG. 3, the board unit 47 is supported by a surface at the −Y direction side of the flow channel cover 73. The board unit 47 is provided with the drive board 82, the wiring board 83, and the drive ICs 84 (a drive controller). The drive board 82 and the wiring board 83 are each a flexible printed board, and are each formed of a base film provided with wiring patterns formed thereon.

The drive board 82 has a mounting part 82*a* and a chip coupling part 82*b*. It should be noted that in the drive board 82, it is also possible to use a rigid board or the like as the mounting part 82*a*. The mounting part 82*a* is supported by the flow channel cover 73. On the surface at the +Y direction side of the mounting part 82*a*, there is mounted the plurality of drive ICs 84. Further, the mounting part 82*a* is coupled to an interface not shown. For example, the interface supplies electrical power supplied from the outside of the inkjet head 5 to the board unit 47, and performs transmission and reception of a control signal.

As shown in FIG. 4, the chip coupling part 82*b* is disposed so as to extend from the mounting part 82*a* toward the −Z direction. As shown in FIG. 6 and FIG. 7, an end portion at the −Z direction side of the chip coupling part 82*b* is coupled to one of the head chips 43.

As shown in FIG. 6 and FIG. 7, the wiring board 83 connects the mounting part 82*a* and the other of the head chips 43. Specifically, out of the wiring board 83, an end portion at the +Z direction side is coupled to the mounting part 82*a*, and an end portion at the −Z direction side is coupled to the other of the head chips 43.

In the present embodiment, there are disposed five drive ICs 84. It should be noted that the number of the drive ICs 84 can be two through four. Further, the number of the drive ICs 84 can also be six or more. These drive ICs 84 are linearly arranged in the X direction as shown in FIG. 4.

These drive ICs 84 drive the head chips 43. It should be noted that in the present embodiment, there is described the configuration in which all of the drive ICs 84 are mounted in a lump on a single drive board 82. However, it is possible to dispose, for example, the drive boards so as to correspond respectively to the drive ICs 84.

It should be noted that in the following description, the plurality of drive ICs 84 linearly arranged in the X direction is referred to as a first drive IC 84*a*, a second drive IC 84*b*, a third drive IC 84*c*, a fourth drive IC 84*d*, and a fifth drive IC 84*e*, respectively, along a direction from the −X direction toward the +X direction. In other words, out of the plurality of drive ICs 84, the drive IC 84 located at the −X direction extreme side is the first drive IC 84*a*, and the drive IC 84 located at the +X direction extreme side is the fifth drive IC 84*e*.

The first drive IC 84*a*, the second drive IC 84*b*, the third drive IC 84*c*, the fourth drive IC 84*d*, and the fifth drive IC 84*e* described above have contact with the heat-transfer plate 79 from the −Y direction, and are thermally coupled to the flow channel member 44. In other words, in the present embodiment, the plurality of drive ICs 84 arranged along the X direction is mounted on the board unit 47, and at the same time, the board unit 47 is thermally coupled to the flow channel member 44.

[Nozzle Guard 42]

As shown in FIG. 4, the nozzle guard 42 is coupled to the base member 40 from the −Z direction, and covers the base member 40 from the −Z direction. The nozzle guard 42 is provided with exposure holes 42*a* for exposing the nozzle plate 46 to the outside. The nozzle holes 81 described above are communicated with the outside of the inkjet head 5 through the exposure holes 42*a*. It should be noted that it is also possible to adopt a configuration in which a cap to be firmly attached to the nozzle guard 42 from the −Z direction to seal the nozzle holes 81 is attached to the nozzle guard 42 when filling the ink or stopping the print operation.

[Operation Method of Printer]

Then, an operation method of the printer 1 when recording a character, a figure, or the like on the recording target medium P using the printer 1 will be described.

It should be noted that it is assumed that as an initial state, the sufficient ink having colors different from each other is respectively encapsulated in the four ink tanks 4 shown in FIG. 1. Further, there is provided a state in which the inkjet heads 5 are filled with the ink in the ink tanks 4 via the ink circulation mechanisms 6, respectively.

As shown in FIG. 1, when making the printer 1 operate with the initial state, the rollers 11, 12 of the conveying mechanisms 2, 3 rotate to thereby convey the recording target medium P between the rollers 11, 12 toward the conveying direction (the X direction). Further, at the same time as the conveying of the recording target medium P, the drive motor 35 rotates the pulley 32 to move the endless belt 34. Thus, the carriage 30 reciprocates in the Y direction while being guided by the guide rails 28, 29.

Further, by appropriately ejecting the four colors of ink on the recording target medium P from the respective inkjet heads 5 during the reciprocation of the carriage 30, it is possible to perform recording of a character, a figure, or the like on the recording target medium P.

Here, the action of each of the inkjet heads 5 will be described.

In a vertically circulating type inkjet head 5 out of such an edge-shoot type as in the present embodiment, first, by making the pressure pump 24 and the suction pump 25 shown in FIG. 2 operate, the ink is circulated in the circulation flow channel 23. In this case, the ink circulating in the ink supply tube 21 inflows into the first flow channel plate 72 through the inflow port 74, and then the ink guided inside the first flow channel plate 72 passes the entrance manifold 76, and then inflows into each of the entrance flow channels 78*c* of the second flow channel plate 78. The ink having flowed into each of the entrance flow channels 78*c* passes through each of the common ink chambers 63, and is then supplied to the inside of each of the ejection channels 50 through the slits 64. The ink having flowed into each of the ejection channels 50 aggregates inside the exit flow channel 78*d* through the circulation channels 80 of the return plate 45, and is subsequently supplied again to the first flow channel plate 72 through the exit manifold 77. The ink having been supplied again to the first flow channel plate 72 is discharged to the ink discharge tube 22 through the discharge port 75. The ink discharged to the ink discharge tube 22 is returned to the ink tank 4, and is then supplied again to the ink supply tube 21. Thus, the ink is made to circulate between the inkjet head 5 and the ink tank 4.

Then, when the reciprocation is started by the carriage 30 (see FIG. 1), drive voltages are applied between the common electrodes 56 and the individual electrodes 58 via the board unit 47. On this occasion, the individual electrodes 58 are set at a drive potential Vdd, and the common electrodes 56 are set at a reference potential GND to apply the drive voltage. Then, a thickness shear deformation occurs in the two drive walls partitioning the ejection channel 50, and the two drive walls each deform so as to protrude toward the non-ejection channel 51. Specifically, since the actuator plate 48 according to the present embodiment has two piezoelectric substrates on which the polarization treatment has been performed in the thickness direction (the Y direction), and which are stacked on one another, by applying the drive voltage, the actuator plate 48 makes a flexural deformation having a V-shape centering on an intermediate position in the Y direction in the drive walls. Thus, the ejection channel 50 deforms as if it bulges.

When the volume of the ejection channel 50 increases due to the deformation of the two drive walls, the ink in the common ink chamber 63 is induced into the ejection channel 50 through the slit 64. Then, the ink induced to the inside of the ejection channel 50 propagates to the inside of the ejection channel 50 as a pressure wave, and the drive voltage applied between the common electrode 56 and the individual electrode 58 is set to zero at the timing at which the pressure wave reaches the nozzle hole 81.

Thus, the drive walls are restored, and the volume of the ejection channel 50 having once increased is restored to the original volume. Due to this operation, the internal pressure of the ejection channel 50 increases to pressurize the ink. As a result, it is possible to eject the ink from the nozzle hole 81. On this occasion, the ink turns to an ink droplet having a droplet shape when passing through the nozzle hole 81, and is then ejected. Thus, it is possible to record a character, an image, or the like on the recording target medium P as described above.

It should be noted that the operation method of the inkjet head 5 is not limited to the content described above. For example, it is also possible to adopt a configuration in which the drive walls in the normal state are deformed toward the inside of the ejection channel 50 as if the ejection channel 50 gives inward. This case can be realized by setting the voltage to be applied between the common electrode 56 and the individual electrode 58 to the voltage having an opposite polarity to that of the voltage described above, or by reversing the polarization direction of the actuator plate 48 without changing the polarity of the voltage. Further, it is also possible to deform the ejection channel 50 so as to bulge outward, and then deform the ejection channel 50 so as to give inward to thereby increase the force for pressurizing the ink when ejecting the ink.

The inkjet head 5 according to the present embodiment described hereinabove is provided with the head chips 43, the flow channel member 44, and the board unit 47. The head chips 43 are each provided with the plurality of ejection channels 50 sequentially arranged from the +X direction toward the −X direction in the X direction, and jet the ink located inside the ejection channels 50. The flow channel member 44 is provided with the guide flow channel 104 for guiding the ink from the +X direction toward the −X direction in the X direction, and at the same time, the guide flow channel 104 is coupled to each of the ejection channels 50. The plurality of drive ICs 84 arranged along the X direction is mounted on the board unit 47, and at the same time, the board unit 47 is thermally coupled to the flow channel member 44. Further, the flow channel member 44 is provided with the cooling flow channel 102 which guides the ink from the −X direction toward the +X direction in the X direction so as to cool the plurality of drive ICs 84.

The head chips 43 provided with the ejection channels 50 for performing the jet operation of the ink and the plurality of drive ICs 84 are two main heat sources in the inkjet head 5. According to the inkjet head 5 related to the present embodiment, the flow channel member 44 is provided with the guide flow channel 104 which is coupled to the ejection channels 50 of the head chips 43 as one of these heat sources. Further, the flow channel member 44 is provided with the cooling flow channel 102 for cooling the plurality of drive ICs 84 as one of these heat sources.

In the guide flow channel 104 and the cooling flow channel 102 described above, the flow direction of the ink in the guide flow channel 104 and the flow direction of the ink in the cooling flow channel 102 for cooling the drive ICs 84 are directions opposite to each other. Therefore, in the guide flow channel 104, the −X direction side in the X direction becomes relatively high in temperature to the +X direction side. In contrast, in the cooling flow channel 102, the +X direction side in the X direction becomes relatively high in temperature to the −X direction side.

As a result, the temperature distribution in view of the whole of the inkjet head 5 is homogenized compared to when the flow direction of the ink in the guide flow channel 104 and the flow direction of the ink in the cooling flow channel 102 are the same as each other. By the overall heat distribution of the inkjet head 5 being homogenized, the temperature of the ink to be supplied to each of the ejection channels 50 is homogenized, and thus, the viscosity of the ink in the ejection channels 50 is also homogenized. Therefore, it is possible to obtain a stable ejection performance. Further, by the overall heat distribution of the inkjet head 5 being homogenized, it is possible to decrease the highest achieving temperature of the drive ICs 84, and thus, it is possible to stably drive the drive ICs 84.

Further, in the inkjet head 5 according to the present embodiment, the flow channel member 44 is provided with the inflow channel 101 and the discharge flow channel 105. The inflow channel 101 guides the ink which inflows from the outside. The discharge flow channel 105 guides the ink to be discharged to the outside. Further, the inflow channel 101, the guide flow channel 104, the cooling flow channel 102, and the discharge flow channel 105 are arranged in series.

According to the inkjet heads 5 in the present embodiment, the ink to be supplied to the ejection channels 50 flows through the cooling flow channel 102. Therefore, it is possible to prevent the pressure from dispersing in the whole flow channels through which the ink flows compared to when the guide flow channel 104 and the cooling flow channel 102 are arranged in parallel to each other between the inflow channel 101 and the discharge flow channel 105. Therefore, when assuming that the pressure in the entrance of the inflow channel 101 and the pressure in the exit of the discharge flow channel 105 are in the same condition as the condition when the guide flow channel 104 and the cooling flow channel 102 are arranged in parallel to each other between the inflow channel 101 and the discharge flow channel 105, the flow rate of the ink increases. Therefore, it becomes possible to increase the cooling efficiency in the cooling flow channel 102.

Further, in the inkjet heads 5 according to the present embodiment, the inflow channel 101, the cooling flow channel 102, the guide flow channel 104, and the discharge flow channel 105 are arranged in this order. In general, the drive ICs 84 become higher in temperature than the head chips 43. According to the inkjet heads 5 in the present embodiment, the ink flows through the cooling flow channel 102 in advance of flowing through the guide flow channel 104. Therefore, the ink in a lower temperature state than when the ink which has flowed through the guide flow channel 104, and has risen in temperature is made to flow through the cooling flow channel 102 can be used for cooling the drive ICs 84. Therefore, it is possible to increase the cooling efficiency of the drive ICs 84.

Further, the inkjet heads 5 according to the present embodiment are each provided with the inflow port 74 and the discharge port 75. The inflow port 74 is coupled to the upstream end of the inflow channel 101. The discharge port 75 is coupled to the downstream end of the discharge flow channel 105. The inflow port 74 and the discharge port 75 are arranged so as to be adjacent to each other at the −X direction side of the center of the flow channel member 44 in the X direction.

According to the inkjet heads 5 in the present embodiment, it becomes possible to arrange the ink supply tube 21 to be coupled to the inflow port 74 and the ink discharge tube 22 to be coupled to the discharge port 75 in a lump so as to be adjacent to each other. Therefore, it is more difficult for the inflow port 74 and the discharge port 75 to cause an obstruction of other constituents than when the inflow port 74 and the discharge port 75 are arranged at a distance from each other.

Further, the ink flows from one side toward the other side in the guide flow channel 104, and the ink flows from the other side toward the one side in the cooling flow channel 102. Therefore, when the guide flow channel 104 and the cooling flow channel 102 are arranged in series to each other, it becomes possible to minimize the length of the flow channel through which the ink flows.

Further, the printer 1 according to the present embodiment is provided with the inkjet heads 5 described above. Therefore, the printer having the stable ejection performance is achieved.

Modified Example of First Embodiment

Figure 10:
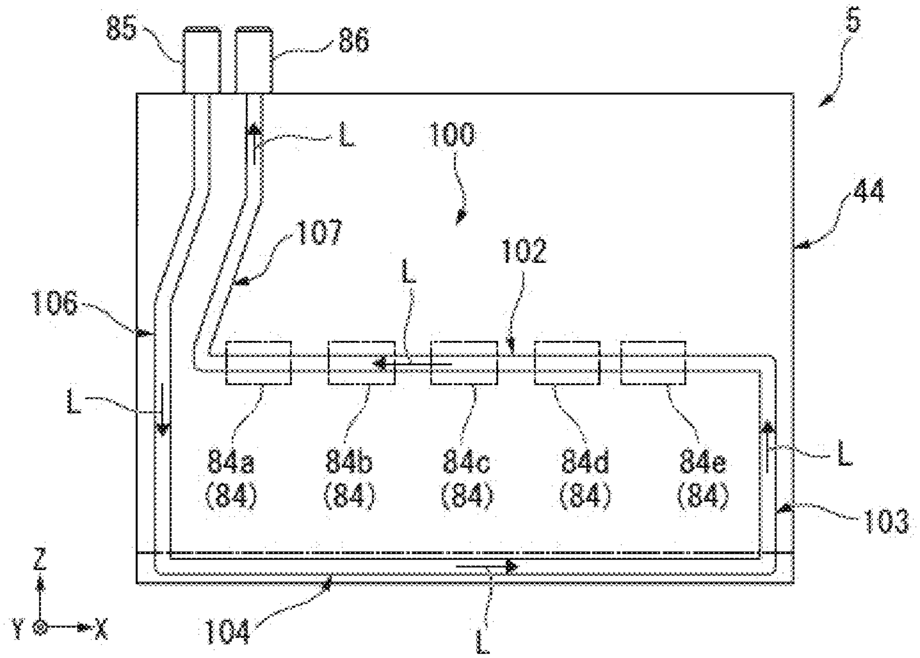
FIG. 10 is a schematic diagram of an inkjet head including an ink flow channel according to a modified example of the first embodiment.

FIG. 10 is a schematic diagram showing a modified example of the inkjet head 5 including the ink flow channel 100 according to the first embodiment. In the present modified example, the flow direction of the ink in the ink flow channel 100 is set opposite to that in the example described above. Specifically, in the present modified example, the inflow channel 101 is used as the discharge flow channel, and the discharge flow channel 105 is used as the inflow channel. Further, the inflow port 74 is used as the discharge port, and the discharge port 75 is used as the inflow port.

It should be noted that in the following description, the discharge flow channel 105 to be used as the inflow channel in the present modified example is referred to as an inflow channel 106, and the inflow channel 101 to be used as the discharge flow channel in the present modified example is referred to as a discharge flow channel 107. Further, the discharge port 75 to be used as the inflow port in the present modified example is referred to as an inflow port 85, and the inflow port 74 to be used as the discharge port in the present modified example is referred to as a discharge port 86.

The inflow channel 106 guides the ink inflowing into the flow channel member 44 from the outside (the ink supply tube 21) of the flow channel member 44 via the inflow port 85. The inflow channel 106 couples the inflow port 85 and the guide flow channel 104 to each other. An upstream end of the inflow channel 106 is coupled to the inflow port 85. A downstream end of the inflow channel 106 is coupled to the guide flow channel 104.

The guide flow channel 104 guides the ink from the −X direction (one side) toward the +X direction (the other side) in the X direction. The guide flow channel 104 couples the inflow channel 106 and the coupling flow channel 103 to each other. An upstream end of the guide flow channel 104 is coupled to the inflow channel 106. A downstream end of the guide flow channel 104 is coupled to the coupling flow channel 103.

The coupling flow channel 103 guides the ink between the guide flow channel 104 and the cooling flow channel 102. The coupling flow channel 103 couples the cooling flow channel 102 and the guide flow channel 104 to each other. An upstream end of the coupling flow channel 103 is coupled to the guide flow channel 104. A downstream end of the coupling flow channel 103 is coupled to the cooling flow channel 102.

The cooling flow channel 102 guides the ink from the +X direction (the other side) toward the −X direction (the one side) in the X direction so as to cool the plurality of drive ICs 84. The cooling flow channel 102 couples the coupling flow channel 103 and the discharge flow channel 107 to each other. An upstream end of the cooling flow channel 102 is coupled to the coupling flow channel 103. A downstream end of the cooling flow channel 102 is coupled to the discharge flow channel 107.

The discharge flow channel 107 guides the ink to be discharged to the outside (the ink discharge tube 22) of the flow channel member 44 via the discharge port 86. The discharge flow channel 107 couples the cooling flow channel 102 and the discharge port 86 to each other. An upstream end of the discharge flow channel 107 is coupled to the cooling flow channel 102. A downstream end of the discharge flow channel 107 is coupled to the discharge port 86.

As described above, in the present embodiment, the inflow channel 106, the guide flow channel 104, the cooling flow channel 102, and the discharge flow channel 107 are arranged in series in the ink flow channel 100. Further, in the flow direction of the ink, the inflow channel 106, the guide flow channel 104, the cooling flow channel 102, and the discharge flow channel 107 are arranged in this order.

According to the present modified example, the distance from the inflow channel 106 to the discharge channels 50 is shorter than when the cooling flow channel 102 is arranged between the inflow channel 106 and the guide flow channel 104. Therefore, it is possible to reduce the pressure loss in the channels to the ejection channels 50, and it becomes possible to suppress a shortage in ink supply amount to the ejection channels 50 to thereby stably jet the ink from the ejection channels 50.

It should be noted that also in the present modified example, in the guide flow channel 104 and the cooling flow channel 102, the flow direction of the ink in the guide flow channel 104 and the flow direction of the ink in the cooling flow channel 102 for cooling the drive ICs 84 are directions opposite to each other. In the guide flow channel 104, the +X direction side in the X direction becomes relatively high in temperature to the −X direction side. In contrast, in the cooling flow channel 102, the −X direction side in the X direction becomes relatively high in temperature to the +X direction side.

As a result, the temperature distribution in view of the whole of the inkjet head 5 is homogenized compared to when the flow direction of the ink in the guide flow channel 104 and the flow direction of the ink in the cooling flow channel 102 are the same as each other. Therefore, it is possible to obtain the stable ejection performance. Further, it is possible to stably drive the drive ICs 84.

Second Embodiment

Then, a second embodiment of the present disclosure will be described. It should be noted that in the present embodiment, the description of substantially the same part as in the first embodiment described above will be omitted or simplified.

Figure 11:
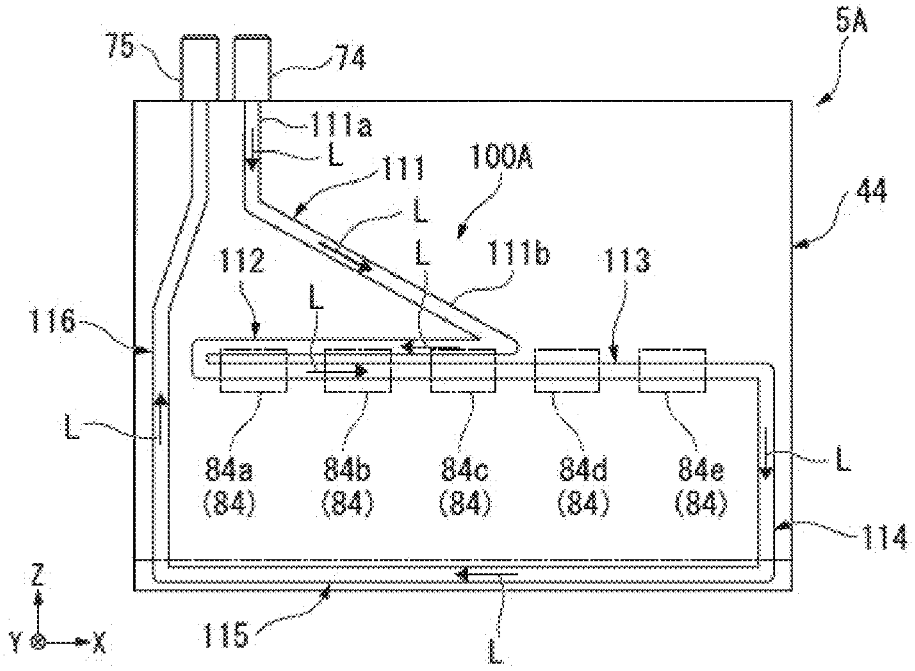
FIG. 11 is a schematic diagram of an inkjet head including an ink flow channel according to a second embodiment.

FIG. 11 is a schematic diagram of an inkjet head 5A including an ink flow channel 100A according to the present embodiment. In the present embodiment, the ink flow channel 100A has an inflow channel 111, a partial cooling flow channel 112 (a second cooling flow channel), a cooling flow channel 113, a coupling flow channel 114, a guide flow channel 115, and a discharge flow channel 116.

The inflow channel 111 guides the ink inflowing into the flow channel member 44 from the outside (the ink supply tube 21) of the flow channel member 44 via the inflow port 74. The inflow channel 111 couples the inflow port 74 and the partial cooling flow channel 112 to each other. An upstream end of the inflow channel 111 is coupled to the inflow port 74. A downstream end of the inflow channel 111 is coupled to the partial cooling flow channel 112.

As shown in FIG. 11, in the present embodiment, the inflow channel 111 has a dropping flow channel 111*a* extending toward the −Z direction from the inflow port 74, and a separating flow channel 111*b* (a separating part) which is displaced toward the +X direction as proceeding toward the −Z direction from a downstream end of the dropping flow channel 111*a*. As shown in FIG. 11, the separating flow channel 111*b* is tilted with respect to the vertical direction (the Z direction), and gets away from the discharge flow channel 116 as proceeding downward (downstream). Such an inflow channel 111 can be disposed by, for example, changing the shape of the first groove part 72*f* in the first embodiment described above, and using a part of the first groove part 72*f*.

The partial cooling flow channel 112 is a flow channel for making the ink flow from the +X direction toward the −X direction in the X direction. The partial cooling flow channel 112 cools one ore more drive ICs 84 located at the −X direction side out of the plurality of drive ICs 84. As shown in FIG. 11, in the present embodiment, the partial cooling flow channel 112 is disposed so as to overlap the first drive IC 84*a*, the second drive IC 84*b*, and the third drive IC 84*c* when viewed from the Y direction, and cools the first drive IC 84*a*, the second drive IC 84*b*, and the third drive IC 84*c*. In other words, the partial cooling flow channel 112 cools a plurality of drive ICs 84 in sequence from the nearest one of the drive ICs 84 to the discharge flow channel 116, but does not cool at least the farthest one of the drive ICs 84 from the discharge flow channel 116.

The partial cooling flow channel 112 couples the inflow channel 111 and the cooling flow channel 113 to each other. An upstream end of the partial cooling flow channel 112 is coupled to the inflow channel 111. A downstream end of the partial cooling flow channel 112 is coupled to the upstream end of the cooling flow channel 113. Such a partial cooling flow channel 112 can be disposed by, for example, changing the shape of the first groove part 72*f* in the first embodiment described above, and using a part of the first groove part 72*f*.

The cooling flow channel 113 guides the ink from the −X direction toward the +X direction in the X direction so as to cool the plurality of drive ICs 84. The cooling flow channel 113 couples the partial cooling flow channel 112 and the coupling flow channel 114 to each other. An upstream end of the cooling flow channel 113 is coupled to the partial cooling flow channel 112. A downstream end of the cooling flow channel 113 is coupled to the coupling flow channel 114.

The coupling flow channel 114 guides the ink between the cooling flow channel 113 and the guide flow channel 115. The coupling flow channel 114 couples the cooling flow channel 113 and the guide flow channel 115 to each other. An upstream end of the coupling flow channel 114 is coupled to the cooling flow channel 113. A downstream end of the coupling flow channel 114 is coupled to the guide flow channel 115.

The guide flow channel 115 guides the ink from the +X direction toward the −X direction in the X direction. The guide flow channel 115 is coupled to the plurality of ejection channels 50 of the head chips 43. The guide flow channel 115 couples the coupling flow channel 114 and the discharge flow channel 116 to each other. An upstream end of the guide flow channel 115 is coupled to the coupling flow channel 114. A downstream end of the guide flow channel 115 is coupled to the discharge flow channel 116.

The discharge flow channel 116 guides the ink to be discharged to the outside (the ink discharge tube 22) of the flow channel member 44 via the discharge port 75. The discharge flow channel 116 couples the guide flow channel 115 and the discharge port 75 to each other. An upstream end of the discharge flow channel 116 is coupled to the guide flow channel 115. A downstream end of the discharge flow channel 116 is coupled to the discharge port 75.

As described above, in the inkjet head 5A according to the present embodiment, the inflow channel 111 has the separating flow channel 111*b* getting away from the discharge flow channel 116 as proceeding downstream. In such an inkjet head 5A according to the present embodiment, it is possible to prevent the ink flowing through the inflow channel 111 from rising in temperature due to the ink high in temperature flowing through the discharge flow channel 116. Therefore, it is possible to supply the cooling flow channel 113 with the ink lower in temperature than when not disposing the separating flow channel 111*b* to thereby increase the cooling efficiency of the drive ICs 84.

Further, in the inkjet head 5A according to the present embodiment, the inflow channel 111 is provided with the partial cooling flow channel 112 for making the ink flow from the +X direction (the one side) toward the −X direction (the other side) in the X direction. The partial flow channel 112 cools one or more drive ICs 84 located at the −X direction side out of the plurality of drive ICs 84. According to the inkjet head 5A in such a present embodiment as described above, it is possible to locally cool the drive ICs 84 arranged at the positions where the temperature is apt to rise due to the ink high in temperature flowing through the discharge flow channel 116. Therefore, it becomes possible to further decrease the highest achieving temperature of the drive ICs 84.

Modified Example of Second Embodiment

Figure 12:
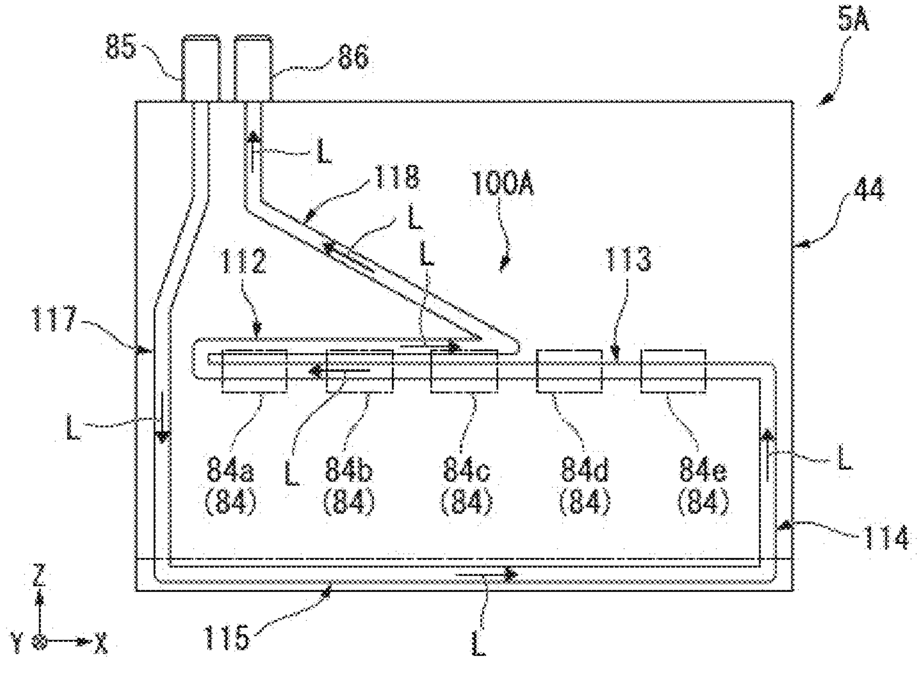
FIG. 12 is a schematic diagram of an inkjet head including an ink flow channel according to a modified example of the second embodiment.

FIG. 12 is a schematic diagram showing a modified example of the inkjet head 5A including the ink flow channel 100A according to the second embodiment. In the present modified example, the flow direction of the ink in the ink flow channel 100A is set opposite to that in the example described above. Specifically, in the present modified example, the inflow channel 111 is used as the discharge flow channel, and the discharge flow channel 116 is used as the inflow channel. Further, the inflow port 74 is used as the discharge port, and the discharge port 75 is used as the inflow port.

It should be noted that in the following description, the discharge flow channel 116 to be used as the inflow channel in the present modified example is referred to as an inflow channel 117, and the inflow channel 111 to be used as the discharge flow channel in the present modified example is referred to as a discharge flow channel 118. Further, the discharge port 75 to be used as the inflow port in the present modified example is referred to as an inflow port 85, and the inflow port 74 to be used as the discharge port in the present modified example is referred to as a discharge port 86.

The inflow channel 117 guides the ink inflowing into the flow channel member 44 from the outside (the ink supply tube 21) of the flow channel member 44 via the inflow port 85. The inflow channel 117 couples the inflow port 85 and the guide flow channel 115 to each other. An upstream end of the inflow channel 117 is coupled to the inflow port 85. A downstream end of the inflow channel 117 is coupled to the guide flow channel 115.

The guide flow channel 115 guides the ink from the −X direction (one side) toward the +X direction (the other side) in the X direction. The guide flow channel 115 couples the inflow channel 117 and the coupling flow channel 114 to each other. An upstream end of the guide flow channel 115 is coupled to the inflow channel 117. A downstream end of the guide flow channel 115 is coupled to the coupling flow channel 114.

The coupling flow channel 114 guides the ink between the guide flow channel 115 and the cooling flow channel 113. The coupling flow channel 114 couples the cooling flow channel 113 and the guide flow channel 115 to each other. An upstream end of the coupling flow channel 114 is coupled to the guide flow channel 115. A downstream end of the coupling flow channel 114 is coupled to the cooling flow channel 113.

The cooling flow channel 113 guides the ink from the +X direction (the other side) toward the −X direction (the one side) in the X direction so as to cool the plurality of drive ICs 84. The cooling flow channel 113 couples the coupling flow channel 114 and the partial cooling flow channel 112 to each other. An upstream end of the cooling flow channel 113 is coupled to the coupling flow channel 114. A downstream end of the cooling flow channel 113 is coupled to the partial cooling flow channel 112.

The partial cooling flow channel 112 guides the ink from the −X direction toward the +X direction in the X direction so as to cool some of the drive ICs 84. The partial cooling flow channel 112 couples the cooling flow channel 113 and the discharge flow channel 118 to each other. An upstream end of the partial cooling flow channel 112 is coupled to the cooling flow channel 113. A downstream end of the partial cooling flow channel 112 is coupled to the discharge flow channel 118.

The discharge flow channel 118 guides the ink to be discharged to the outside (the ink discharge tube 22) of the flow channel member 44 via the discharge port 86. The discharge flow channel 118 couples the partial cooling flow channel 112 and the discharge port 86 to each other. An upstream end of the discharge flow channel 118 is coupled to the partial cooling flow channel 112. A downstream end of the discharge flow channel 118 is coupled to the discharge port 86.

As described above, in the present embodiment, the inflow channel 117, the guide flow channel 115, the cooling flow channel 113, and the discharge flow channel 118 are arranged in series in the ink flow channel 100A. Further, in the flow direction of the ink, the inflow channel 111, the guide flow channel 115, the cooling flow channel 113, and the discharge flow channel 118 are arranged in this order.

According to the present modified example, the distance from the inflow channel 117 to the discharge channels 50 is shorter than when the cooling flow channel 113 and the partial cooling flow channel 112 are arranged between the inflow channel 117 and the guide flow channel 115. Therefore, it is possible to reduce the pressure loss in the channels to the ejection channels 50, and it becomes possible to suppress a shortage in ink supply amount to the ejection channels 50 to thereby stably jet the ink from the ejection channels 50.

It should be noted that also in the present modified example, in the guide flow channel 115 and the cooling flow channel 113, the flow direction of the ink in the guide flow channel 115 and the flow direction of the ink in the cooling flow channel 113 for cooling the drive ICs 84 are directions opposite to each other. In the guide flow channel 115, the +X direction side in the X direction becomes relatively high in temperature to the −X direction side. In contrast, in the cooling flow channel 113, the −X direction side in the X direction becomes relatively high in temperature to the +X direction side.

As a result, the temperature distribution in view of the whole of the inkjet head 5A is homogenized compared to when the flow direction of the ink in the guide flow channel 115 and the flow direction of the ink in the cooling flow channel 113 are the same as each other. Therefore, it is possible to obtain the stable ejection performance. Further, it is possible to stably drive the drive ICs 84.

Third Embodiment

Then, a third embodiment of the present disclosure will be described. It should be noted that in the present embodiment, the description of substantially the same part as in the first embodiment described above will be omitted or simplified.

Figure 13:
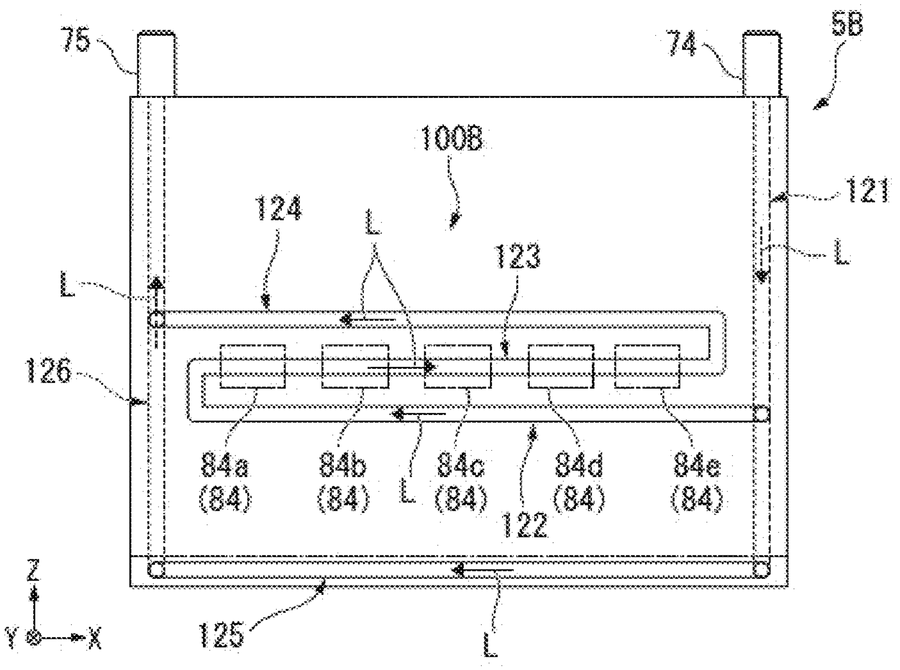
FIG. 13 is a schematic diagram of an inkjet head including an ink flow channel according to a third embodiment.
Figure 14:
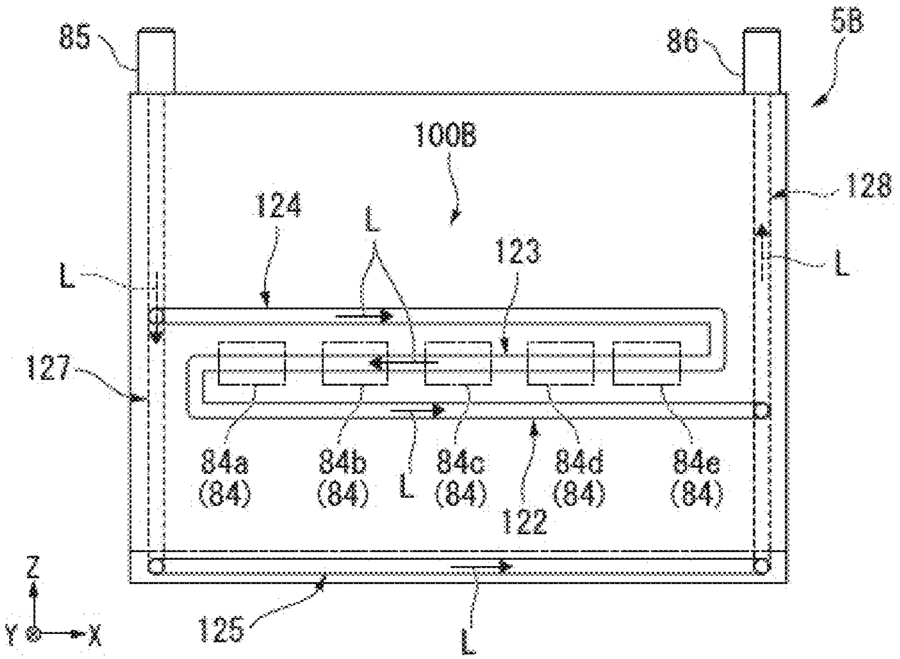
FIG. 14 is a schematic diagram of an inkjet head including an ink flow channel according to a modified example of the third embodiment.

FIG. 13 is a schematic diagram of an inkjet head 5B including an ink flow channel 100B according to the present embodiment. In the inkjet head 5B according to the present embodiment, the inflow port 74 is arranged in an end portion at the +X direction side of the flow channel member 44, and the discharge port 75 is arranged in an end portion at the −X direction side of the flow channel member 44.

In the present embodiment, the ink flow channel 100B has an inflow channel 121, a first coupling flow channel 122, a cooling flow channel 123, a second coupling flow channel 124, a guide flow channel 125, and a discharge flow channel 126.

The inflow channel 121 guides the ink inflowing into the flow channel member 44 from the outside (the ink supply tube 21) of the flow channel member 44 via the inflow port 74. The inflow channel 121 couples the inflow port 74, and the first coupling flow channel 122 and the guide flow channel 125 to each other. An upstream end of the inflow channel 121 is coupled to the inflow port 74. A downstream end of the inflow channel 121 is coupled to the guide flow channel 125. Further, an intermediate region of the inflow channel 121 is coupled to the first coupling flow channel 122.

It should be noted that in the present embodiment, the inflow channel 121 is disposed at the +Y direction side of the flow channel member 44. Such an inflow channel 121 can be formed by, for example, forming a groove part on a surface at the +Y direction side of the first flow channel plate 72, and covering the groove part with a cover.

The first coupling flow channel 122 couples the inflow channel 121 and the cooling flow channel 123 to each other. An upstream end of the first coupling flow channel 122 is coupled to the intermediate region of the inflow channel 121. A downstream end of the first coupling flow channel 122 is bent, and is coupled to the cooling flow channel 123. Such a first coupling flow channel 122 mainly guides the ink from the +X direction toward the −X direction.

The cooling flow channel 123 guides the ink from the −X direction toward the +X direction in the X direction so as to cool the plurality of drive ICs 84. The cooling flow channel 123 couples the first coupling flow channel 122 and the second coupling flow channel 124 to each other. An upstream end of the cooling flow channel 123 is coupled to the first coupling flow channel 122. A downstream end of the cooling flow channel 123 is coupled to the second coupling flow channel 124.

The second coupling flow channel 124 couples the cooling flow channel 123 and the discharge flow channel 126 to each other. An upstream end of the second coupling flow channel 124 is bent, and is coupled to the cooling flow channel 123. A downstream end of the second coupling flow channel 124 is coupled to an intermediate region of the discharge flow channel 126. Such a second coupling flow channel 124 mainly guides the ink from the +X direction toward the −X direction.

The first coupling flow channel 122, the cooling flow channel 123, and the second coupling flow channel 124 can be formed by, for example, forming a groove part on a surface at the −Y direction side of the first flow channel plate 72, and covering the groove part with a cover.

The guide flow channel 125 guides the ink from the +X direction toward the −X direction in the X direction. The guide flow channel 125 is coupled to the plurality of ejection channels 50 of the head chips 43. The guide flow channel 125 couples the inflow channel 121 and the discharge flow channel 126 to each other. An upstream end of the guide flow channel 125 is coupled to the inflow channel 121. A downstream end of the guide flow channel 125 is coupled to the discharge flow channel 126.

The discharge flow channel 126 guides the ink to be discharged to the outside (the ink discharge tube 22) of the flow channel member 44 via the discharge port 75. The discharge flow channel 126 couples the guide flow channel 125 and the second coupling flow channel 124, and the discharge port 75 to each other. An upstream end of the discharge flow channel 126 is coupled to the guide flow channel 125. A downstream end of the discharge flow channel 126 is coupled to the discharge port 75. Further, the intermediate region of the discharge flow channel 126 is coupled to the second coupling flow channel 124.

It should be noted that in the present embodiment, the discharge flow channel 126 is disposed at the +Y direction side of the flow channel member 44. Such a discharge flow channel 126 can be formed by, for example, forming a groove part on a surface at the +Y direction side of the first flow channel plate 72, and covering the groove part with a cover.

As described above, in the inkjet head 5B according to the present embodiment, the flow channel member 44 is provided with the inflow channel 121 for guiding the ink inflowing from the outside, and the discharge flow channel 126 for guiding the ink to be discharged to the outside. Further, the guide flow channel 125 and the cooling flow channel 123 are arranged in parallel to each other between the inflow channel 121 and the discharge flow channel 126.

According to such an inkjet head 5B in the present embodiment, the distance from the inflow channel 121 to the discharge channels 50 is shorter than when the cooling flow channel 123 is arranged between the inflow channel 121 and the guide flow channel 125. Therefore, it is possible to reduce the pressure loss in the channels to the ejection channels 50, and it becomes possible to suppress a shortage in ink supply amount to the ejection channels 50 to thereby stably jet the ink from the ejection channels 50.

Further, in the inkjet head 5B according to the present embodiment, the flow channel member 44 is provided with the first coupling flow channel 122 arranged between the inflow channel 121 and the upstream end of the cooling flow channel 123, and the second coupling flow channel 124 arranged between the downstream end of the cooling flow channel 123 and the discharge flow channel 126. Further, the first coupling flow channel 122 and the second coupling flow channel 124 guide the ink from the +X direction toward the −X direction in the X direction.

According to such an inkjet head 5B in the present embodiment, there is formed a meandering flow channel consisting of the first coupling flow channel 122, the cooling flow channel 123, and the second coupling flow channel 124. Therefore, it results that the ink flows in a large area of the flow channel member 44, and it becomes possible to further homogenize the overall heat distribution of the inkjet head 5B.

Modified Example of Third Embodiment

FIG. 13 is a schematic diagram showing a modified example of the inkjet head 5B including the ink flow channel 100B according to the third embodiment. In the present modified example, the flow direction of the ink in the ink flow channel 100B is set opposite to that in the example described above. Specifically, in the present modified example, the inflow channel 121 is used as the discharge flow channel, and the discharge flow channel 126 is used as the inflow channel. Further, the inflow port 74 is used as the discharge port, and the discharge port 75 is used as the inflow port.

It should be noted that in the following description, the discharge flow channel 126 to be used as the inflow channel in the present modified example is referred to as an inflow channel 127, and the inflow channel 121 to be used as the discharge flow channel in the present modified example is referred to as a discharge flow channel 128. Further, the discharge port 75 to be used as the inflow port in the present modified example is referred to as an inflow port 85, and the inflow port 74 to be used as the discharge port in the present modified example is referred to as a discharge port 86.

The inflow channel 127 guides the ink inflowing into the flow channel member 44 from the outside (the ink supply tube 21) of the flow channel member 44 via the inflow port 85. The inflow channel 127 couples the guide flow channel 125 and the second coupling flow channel 124, and the inflow port 85 to each other. An upstream end of the inflow channel 127 is coupled to the inflow port 85. A downstream end of the inflow channel 127 is coupled to the guide flow channel 125. Further, an intermediate region of the inflow channel 127 is coupled to the second coupling flow channel 124.

The guide flow channel 125 guides the ink from the −X direction toward the +X direction in the X direction. The guide flow channel 125 couples the inflow channel 127 and the discharge flow channel 128 to each other. An upstream end of the guide flow channel 125 is coupled to the inflow channel 127. A downstream end of the guide flow channel 125 is coupled to the discharge flow channel 128.

The second coupling flow channel 124 couples the discharge flow channel 128 and the cooling flow channel 123 to each other. An upstream end of the second coupling flow channel 124 is coupled to an intermediate region of the discharge flow channel 128. A downstream end of the second coupling flow channel 124 is bent, and is coupled to the cooling flow channel 123. Such a second coupling flow channel 124 mainly guides the ink from the −X direction toward the +X direction.

The cooling flow channel 123 guides the ink from the +X direction toward the −X direction in the X direction so as to cool the plurality of drive ICs 84. The cooling flow channel 123 couples the second coupling flow channel 124 and the first coupling flow channel 122 to each other. An upstream end of the cooling flow channel 123 is coupled to the second coupling flow channel 124. A downstream end of the cooling flow channel 123 is coupled to the first coupling flow channel 122.

The first coupling flow channel 122 couples the cooling flow channel 123 and the discharge flow channel 128 to each other. An upstream end of the first coupling flow channel 122 is bent, and is coupled to the cooling flow channel 123. A downstream end of the first coupling flow channel 122 is coupled to the intermediate region of the discharge flow channel 128. Such a first coupling flow channel 122 mainly guides the ink from the −X direction toward the +X direction.

The discharge flow channel 128 guides the ink to be discharged to the outside (the ink discharge tube 22) of the flow channel member 44 via the discharge port 86. The discharge flow channel 128 couples the discharge port 86, and the first coupling flow channel 122 and the guide flow channel 125 to each other. An upstream end of the discharge flow channel 128 is coupled to the guide flow channel 125. A downstream end of the discharge flow channel 128 is coupled to the discharge port 86. Further, the intermediate region of the discharge flow channel 128 is coupled to the first coupling flow channel 122.

Also in the present modified example, the distance from the inflow channel 127 to the discharge channels 50 is shorter than when the cooling flow channel 123 is arranged between the inflow channel 127 and the guide flow channel 125. Therefore, it is possible to reduce the pressure loss in the channels to the ejection channels 50, and it becomes possible to suppress a shortage in ink supply amount to the ejection channels 50 to thereby stably jet the ink from the ejection channels 50.

It should be noted that also in the present modified example, in the guide flow channel 125 and the cooling flow channel 123, the flow direction of the ink in the guide flow channel 125 and the flow direction of the ink in the cooling flow channel 123 for cooling the drive ICs 84 are directions opposite to each other. In the guide flow channel 125, the +X direction side in the X direction becomes relatively high in temperature to the −X direction side. In contrast, in the cooling flow channel 123, the −X direction side in the X direction becomes relatively high in temperature to the +X direction side.

As a result, the temperature distribution in view of the whole of the inkjet head 5B is homogenized compared to when the flow direction of the ink in the guide flow channel 125 and the flow direction of the ink in the cooling flow channel 123 are the same as each other. Therefore, it is possible to obtain the stable ejection performance. Further, it is possible to stably drive the drive ICs 84.

Further, also in the present modified example, there is formed the meandering flow channel consisting of the first coupling flow channel 122, the cooling flow channel 123, and the second coupling flow channel 124. Therefore, it results that the ink flows in a large area of the flow channel member 44, and it becomes possible to further homogenize the overall heat distribution of the inkjet head 5B.

Fourth Embodiment

Then, a fourth embodiment of the present disclosure will be described. It should be noted that in the present embodiment, the description of substantially the same part as in the first embodiment described above will be omitted or simplified.

Figure 15:
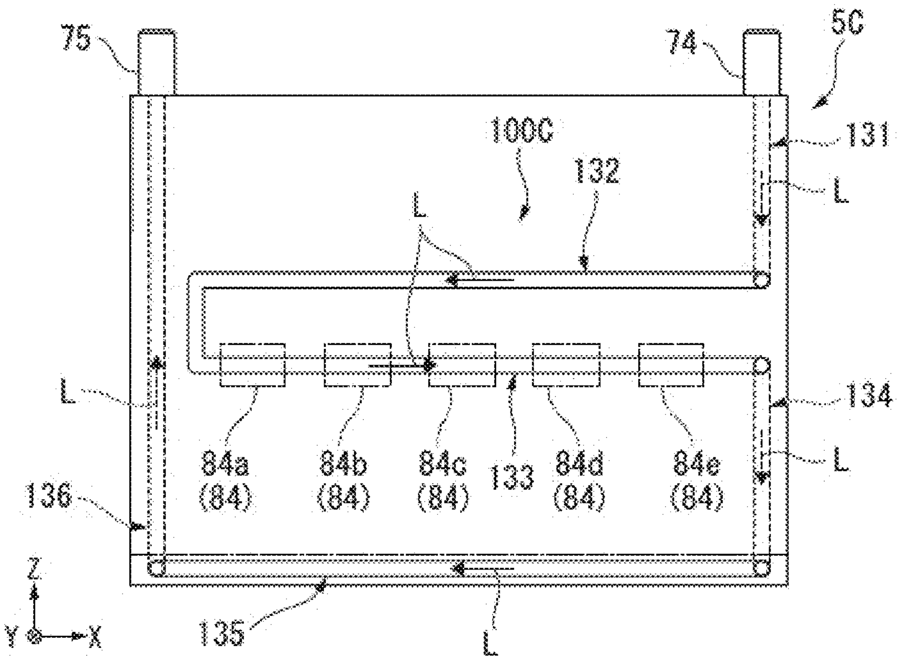
FIG. 15 is a schematic diagram of an inkjet head including an ink flow channel according to a fourth embodiment.

FIG. 15 is a schematic diagram of an inkjet head 5C including an ink flow channel 100C according to the present embodiment. In the inkjet head 5C according to the present embodiment, the inflow port 74 is arranged in an end portion at the +X direction side of the flow channel member 44, and the discharge port 75 is arranged in an end portion at the −X direction side of the flow channel member 44.

In the present embodiment, the ink flow channel 100C has an inflow channel 131, an upper coupling flow channel 132 (a fourth coupling flow channel), a cooling flow channel 133, a lower coupling flow channel 134 (a third coupling flow channel), a guide flow channel 135, and a discharge flow channel 136.

The inflow channel 131 guides the ink inflowing into the flow channel member 44 from the outside (the ink supply tube 21) of the flow channel member 44 via the inflow port 74. The inflow channel 131 couples the inflow port 74 and the upper coupling flow channel 132 to each other. An upstream end of the inflow channel 131 is coupled to the inflow port 74. A downstream end of the inflow channel 131 is coupled to the upper coupling flow channel 132.

It should be noted that in the present embodiment, the inflow channel 131 is disposed at the +Y direction side of the flow channel member 44. Such an inflow channel 131 can be formed by, for example, forming a groove part on a surface at the +Y direction side of the first flow channel plate 72, and covering the groove part with a cover.

The upper coupling flow channel 132 couples the inflow channel 131 and the cooling flow channel 133 to each other. An upstream end of the upper coupling flow channel 132 is coupled to the inflow channel 131. A downstream end of the upper coupling flow channel 132 is bent, and is coupled to the cooling flow channel 133. Such an upper coupling flow channel 132 mainly guides the ink from the +X direction toward the −X direction.

The cooling flow channel 133 guides the ink from the −X direction toward the +X direction in the X direction so as to cool the plurality of drive ICs 84. The cooling flow channel 133 couples the upper coupling flow channel 132 and the lower coupling flow channel 134 to each other. An upstream end of the cooling flow channel 133 is coupled to the upper coupling flow channel 132. A downstream end of the cooling flow channel 133 is coupled to the lower coupling flow channel 134.

The lower coupling flow channel 134 couples the cooling flow channel 133 and the guide flow channel 135 to each other. An upstream end of the lower coupling flow channel 134 is coupled to the cooling flow channel 133. A downstream end of the lower coupling flow channel 134 is coupled to the guide flow channel 135. Such a lower coupling flow channel 134 guides the ink from the +Z direction toward the −Z direction.

It should be noted that it is possible to adopt a configuration in which the ink is guided from the +X direction toward the −X direction in a part or a whole of the lower coupling flow channel 134. In such a case, it is possible to guide the ink in the Z direction in the upper coupling flow channel 132.

The upper coupling flow channel 132, the cooling flow channel 133, and the lower coupling flow channel 134 can be formed by, for example, forming a groove part on a surface at the −Y direction side of the first flow channel plate 72, and covering the groove part with a cover.

The guide flow channel 135 guides the ink from the +X direction toward the −X direction in the X direction. The guide flow channel 135 is coupled to the plurality of ejection channels 50 of the head chips 43. The guide flow channel 135 couples the lower coupling flow channel 134 and the discharge flow channel 136 to each other. An upstream end of the guide flow channel 135 is coupled to the lower coupling flow channel 134. A downstream end of the guide flow channel 135 is coupled to the discharge flow channel 136.

The discharge flow channel 136 guides the ink to be discharged to the outside (the ink discharge tube 22) of the flow channel member 44 via the discharge port 75. The discharge flow channel 136 couples the guide flow channel 135 and the discharge port 75 to each other. An upstream end of the discharge flow channel 136 is coupled to the guide flow channel 135. A downstream end of the discharge flow channel 136 is coupled to the discharge port 75.

It should be noted that in the present embodiment, the discharge flow channel 136 is disposed at the +Y direction side of the flow channel member 44. Such a discharge flow channel 136 can be formed by, for example, forming a groove part on a surface at the +Y direction side of the first flow channel plate 72, and covering the groove part with a cover.

As described above, in the inkjet heads 5C according to the present embodiment, the inflow channel 131, the cooling flow channel 133, the guide flow channel 135, and the discharge flow channel 136 are arranged in series. Therefore, it is possible to prevent the pressure from dispersing in the whole flow channels through which the ink flows compared to when the guide flow channel 135 and the cooling flow channel 133 are arranged in parallel to each other between the inflow channel 131 and the discharge flow channel 136. Therefore, when assuming that the pressure in the entrance of the inflow channel 131 and the pressure in the exit of the discharge flow channel 136 are in the same condition as the condition when the guide flow channel 135 and the cooling flow channel 133 are arranged in parallel to each other between the inflow channel 131 and the discharge flow channel 136, the flow rate of the ink increases. Therefore, it becomes possible to increase the cooling efficiency in the cooling flow channel 133.

Further, in the inkjet head 5C according to the present embodiment, the flow channel member 44 is provided with the lower coupling flow channel 134 coupling the guide flow channel 135 and the cooling flow channel 133 to each other, and the upper coupling flow channel 132 coupled to an end portion of the cooling flow channel 133, the end portion being located at the opposite side to the end portion coupled to the lower coupling flow channel 134. Further, the upper coupling flow channel 132 mainly guides the ink from the +X direction toward the −X direction in the X direction. According to such an inkjet head 5C in the present embodiment, there is formed a meandering flow channel consisting of the upper coupling flow channel 132, the cooling flow channel 133, and the lower coupling flow channel 134. Therefore, it results that the ink flows in a large area of the flow channel member 44, and it becomes possible to further homogenize the overall heat distribution of the inkjet head 5C.

Modified Example of Fourth Embodiment

Figure 16:
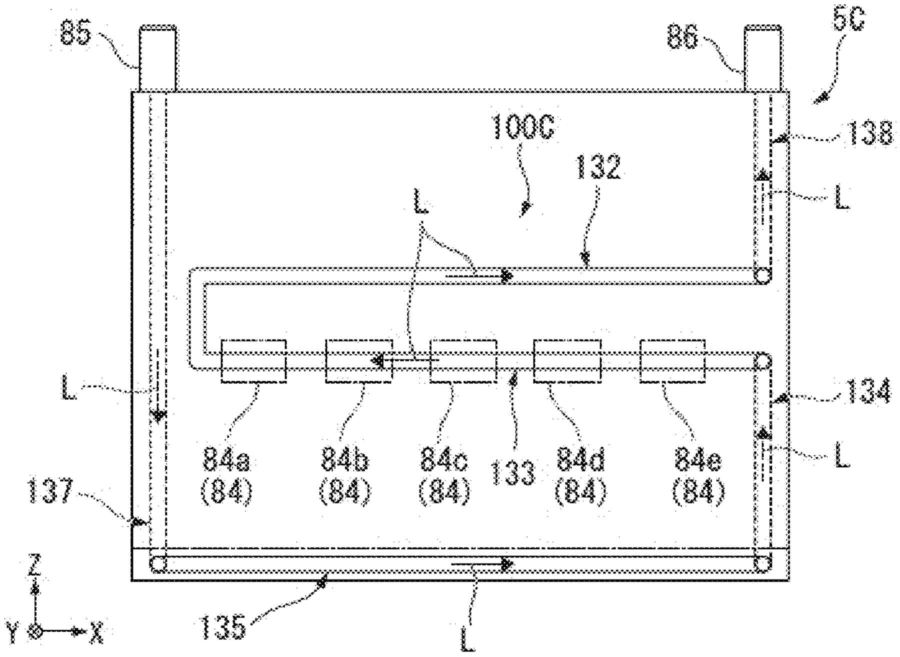
FIG. 16 is a schematic diagram of an inkjet head including an ink flow channel according to a modified example of the fourth embodiment.

FIG. 16 is a schematic diagram showing a modified example of the inkjet head 5C including the ink flow channel 100C according to the fourth embodiment. In the present modified example, the flow direction of the ink in the ink flow channel 100C is set opposite to that in the example described above. Specifically, in the present modified example, the inflow channel 131 is used as the discharge flow channel, and the discharge flow channel 136 is used as the inflow channel. Further, the inflow port 74 is used as the discharge port, and the discharge port 75 is used as the inflow port.

It should be noted that in the following description, the discharge flow channel 136 to be used as the inflow channel in the present modified example is referred to as an inflow channel 137, and the inflow channel 131 to be used as the discharge flow channel in the present modified example is referred to as a discharge flow channel 138. Further, the discharge port 75 to be used as the inflow port in the present modified example is referred to as an inflow port 85, and the inflow port 74 to be used as the discharge port in the present modified example is referred to as a discharge port 86.

The inflow channel 137 guides the ink inflowing into the flow channel member 44 from the outside (the ink supply tube 21) of the flow channel member 44 via the inflow port 85. The inflow channel 137 couples the inflow port 85 and the guide flow channel 135 to each other. An upstream end of the inflow channel 137 is coupled to the inflow port 85. A downstream end of the inflow channel 137 is coupled to the guide flow channel 135.

The guide flow channel 135 guides the ink from the −X direction toward the +X direction in the X direction. The guide flow channel 135 is coupled to the plurality of ejection channels 50 of the head chips 43. The guide flow channel 135 couples the inflow channel 137 and the lower coupling flow channel 134 to each other. An upstream end of the guide flow channel 135 is coupled to the inflow channel 137. A downstream end of the guide flow channel 135 is coupled to the lower coupling flow channel 134.

The lower coupling flow channel 134 couples the guide flow channel 135 and the cooling flow channel 133 to each other. An upstream end of the lower coupling flow channel 134 is coupled to the guide flow channel 135. A downstream end of the lower coupling flow channel 134 is coupled to the cooling flow channel 133. Such a lower coupling flow channel 134 guides the ink from the −Z direction toward the +Z direction.

The cooling flow channel 133 guides the ink from the +X direction toward the −X direction in the X direction so as to cool the plurality of drive ICs 84. The cooling flow channel 133 couples the lower coupling flow channel 134 and the upper coupling flow channel 132 to each other. An upstream end of the cooling flow channel 133 is coupled to the lower coupling flow channel 134. A downstream end of the cooling flow channel 133 is coupled to the upper coupling flow channel 132.

The upper coupling flow channel 132 couples the cooling flow channel 133 and the inflow channel 131 to each other. An upstream end of the upper coupling flow channel 132 is bent, and is coupled to the cooling flow channel 133. A downstream end of the upper coupling flow channel 132 is coupled to the inflow channel 131. Such an upper coupling flow channel 132 mainly guides the ink from the −X direction toward the +X direction.

The discharge flow channel 138 guides the ink to be discharged to the outside (the ink discharge tube 22) of the flow channel member 44 via the discharge port 86. The discharge flow channel 138 couples the discharge port 86 and the upper coupling flow channel 132 to each other. An upstream end of the discharge flow channel 138 is coupled to the upper coupling flow channel 132. A downstream end of the discharge flow channel 138 is coupled to the discharge port 86.

According to the present modified example, the distance from the inflow channel 137 to the discharge channels 50 is shorter than when the upper coupling flow channel 132, the cooling flow channel 133, and the lower coupling flow channel 134 are arranged between the inflow channel 137 and the guide flow channel 135. Therefore, it is possible to reduce the pressure loss in the channels to the ejection channels 50, and it becomes possible to suppress a shortage in ink supply amount to the ejection channels 50 to thereby stably jet the ink from the ejection channels 50.

It should be noted that also in the present modified example, in the guide flow channel 135 and the cooling flow channel 133, the flow direction of the ink in the guide flow channel 135 and the flow direction of the ink in the cooling flow channel 133 for cooling the drive ICs 84 are directions opposite to each other. In the guide flow channel 135, the +X direction side in the X direction becomes relatively high in temperature to the −X direction side. In contrast, in the cooling flow channel 133, the −X direction side in the X direction becomes relatively high in temperature to the +X direction side.

As a result, the temperature distribution in view of the whole of the inkjet head 5C is homogenized compared to when the flow direction of the ink in the guide flow channel 135 and the flow direction of the ink in the cooling flow channel 133 are the same as each other. Therefore, it is possible to obtain the stable ejection performance. Further, it is possible to stably drive the drive ICs 84.

Further, also in the present modified example, there is formed the meandering flow channel consisting of the upper coupling flow channel 132, the cooling flow channel 133, and the lower coupling flow channel 134. Therefore, it results that the ink flows in a large area of the flow channel member 44, and it becomes possible to further homogenize the overall heat distribution of the inkjet head 5C.

It should be noted that the technical scope of the present disclosure is not limited to the embodiments described above, but a variety of modifications can be applied within the scope or the spirit of the present disclosure.

For example, in the embodiments described above, the description is presented citing the printer 1 as an example of the liquid jet device, but the printer is not a limitation. For example, a facsimile machine, an on-demand printing machine, and so on can also be adopted.

In the embodiments described above, the description is presented citing the configuration (a so-called shuttle machine) in which the inkjet head moves with respect to the recording target medium when performing printing as an example, but this configuration is not a limitation. The configuration related to the present disclosure can be adopted as the configuration (a so-called stationary head machine) in which the recording target medium is moved with respect to the inkjet head in the state in which the inkjet head is fixed.

In the embodiments described above, there is described when the recording target medium P is paper, but this configuration is not a limitation. The recording target medium P is not limited to paper, but can also be a metal material or a resin material, and can also be food or the like.

In the embodiments described above, there is described the configuration in which the liquid jet head is installed in the liquid jet recording device, but this configuration is not a limitation. Specifically, the liquid to be jetted from the liquid jet head is not limited to what is landed on the recording target medium, but can also be, for example, a medical solution to be blended during a dispensing process, a food additive such as seasoning or a spice to be added to food, or fragrance to be sprayed in the air.

In the embodiments described above, the head chips of an edge shoot type are described, but this is not a limitation. For example, it is also possible to apply the present disclosure to a head chip of a so-called side shoot type for ejecting the ink from a central part in the extending direction in the ejection channel.

Further, it is also possible to apply the present disclosure to a head chip of a so-called roof shoot type in which the direction of the pressure applied to the ink and the ejection direction of the ink are made to coincide with each other.

In the embodiment described above, there is described the configuration in which the Z direction coincides with the gravitational direction, but this configuration is not a limitation, and it is also possible to set the Z direction to a direction along the horizontal direction.

In the embodiments described above, there is described the configuration in which the two head chips are mounted on one jet module, but this configuration is not a limitation. Specifically, it is also possible to adopt a configuration in which one head chip is mounted on one jet module.

In the embodiments described above, there is described the configuration in which a part of the ink discharged from the ink tank returns to the ink tank, namely the configuration in which the ink is circulated. However, it is also possible to adopt a configuration in which the ink which has been ejected from the ink tank and supplied to the head chip does not return to the ink tank.

Besides the above, it is arbitrarily possible to replace the constituents in the embodiments described above with known constituents within the scope or the spirit of the present disclosure, and it is also possible to arbitrarily combine the modified examples described above.

What is claimed is:

1. A liquid jet head comprising:

a jet unit which is provided with a plurality of pressure chambers arranged in sequence from one side toward the other side in a first direction, and which is configured to jet liquid located inside the pressure chambers;

a flow channel member which is provided with a guide flow channel configured to guide the liquid from the one side toward the other side in the first direction, and in which the guide flow channel is coupled to each of the pressure chambers and provides the liquid to the pressure chambers; and a circuit board on which a plurality of drive controllers arranged along the first direction is mounted, and which is thermally coupled to the flow channel member, wherein the flow channel member is provided with a cooling flow channel which is configured to guide the liquid from the other side toward the one side in the first direction so as to cool the plurality of drive controllers.

2. The liquid jet head according to claim 1, wherein the flow channel member is provided with an inflow channel configured to guide the liquid inflowing from an outside, and a discharge flow channel configured to guide the liquid to be discharged to the outside, and the guide flow channel and the cooling flow channel are arranged in parallel to each other between the inflow channel and the discharge flow channel.

3. The liquid jet head according to claim 2, wherein the flow channel member is provided with a first coupling flow channel arranged between the inflow channel and an upstream end of the cooling flow channel, and a second coupling flow channel arranged between a downstream end of the cooling flow channel and the discharge flow channel, and the first coupling flow channel and the second coupling flow channel guide the liquid from the one side toward the other side in the first direction.

4. The liquid jet head according to claim 1, wherein the flow channel member is provided with an inflow channel configured to guide the liquid inflowing from an outside, and a discharge flow channel configured to guide the liquid to be discharged to the outside, and the inflow channel, the guide flow channel, the cooling flow channel, and the discharge flow channel are arranged in series.

5. The liquid jet head according to claim 4, wherein the inflow channel, the cooling flow channel, the guide flow channel, and the discharge flow channel are arranged in this order.

6. The liquid jet head according to claim 4, wherein the inflow channel, the guide flow channel, the cooling flow channel, and the discharge flow channel are arranged in this order.

7. The liquid jet head according to claim 5, wherein the flow channel member is provided with a third coupling flow channel configured to couple the guide flow channel and the cooling flow channel to each other, and a fourth coupling flow channel coupled to an end portion of the cooling flow channel, the end portion being located at an opposite side to an end portion of the cooling flow channel in which the cooling flow channel is coupled to the third coupling flow channel, and at least a part of at least one of the third coupling flow channel and the fourth coupling flow channel guides the liquid from the one side toward the other side in the first direction.

8. The liquid jet head according to claim 2, further comprising:

an inflow port coupled to an upstream end of the inflow channel; and a discharge port coupled to a downstream end of the discharge flow channel, wherein the inflow port and the discharge port are arranged adjacent to each other at the one side or the other side of a center of the flow channel member in the first direction.

9. The liquid jet head according to claim 8, wherein the inflow channel has a separating part which gets away from the discharge flow channel as proceeding downstream.

10. The liquid jet head according to claim 2, wherein the flow channel member is provided with a second cooling flow channel which is configured to make the liquid flow from the one side toward the other side in the first direction, and the second cooling flow channel is configured to cool one or more drive controllers located at the other side out of the plurality of drive controllers.

11. A liquid jet recording device comprising the liquid jet head according to claim 1.

* * * * *